US010643396B2

(12) United States Patent
Eastwood et al.

(10) Patent No.: US 10,643,396 B2
(45) Date of Patent: May 5, 2020

(54) METHODS AND SOFTWARE FOR CREATING A 3D IMAGE FROM IMAGES OF MULTIPLE HISTOLOGICAL SECTIONS AND FOR MAPPING ANATOMICAL INFORMATION FROM A REFERENCE ATLAS TO A HISTOLOGICAL IMAGE

(71) Applicant: Microbrightfield, Inc., Williston, VT (US)

(72) Inventors: Brian S. Eastwood, Northampton, MA (US); Susan Tappan, Hinesburg, VT (US); Nathan J. O'Connor, Essex Junction, VT (US)

(73) Assignee: Microbrightfield, Inc., Williston, VT (US)

( * ) Notice: Subject to any disclaimer, the term of this patent is extended or adjusted under 35 U.S.C. 154(b) by 0 days.

(21) Appl. No.: 15/811,039

(22) Filed: Nov. 13, 2017

(65) Prior Publication Data
US 2018/0137689 A1 May 17, 2018

Related U.S. Application Data

(60) Provisional application No. 62/420,983, filed on Nov. 11, 2016.

(51) Int. Cl.
*G06T 19/20* (2011.01)
*G06T 7/194* (2017.01)
(Continued)

(52) U.S. Cl.
CPC ............. *G06T 19/20* (2013.01); *G06T 7/11* (2017.01); *G06T 7/194* (2017.01); *G06T 15/08* (2013.01);
(Continued)

(58) Field of Classification Search
None
See application file for complete search history.

(56) References Cited

U.S. PATENT DOCUMENTS 9,317,894 B2 4/2016 Heibel et al.
2013/0168545 A1* 7/2013 Clem ................. H01J 49/0004
250/282

(Continued)

FOREIGN PATENT DOCUMENTS

DE 102013107301 A1 1/2015

OTHER PUBLICATIONS

Allen Mouse Common Coordinate Framework; Technical White Paper; Allen Institute for Brain Science; May 2015 v. 1; pp. 1-18.

*Primary Examiner* — Jeffrey J Chow
(74) *Attorney, Agent, or Firm* — Downs Rachlin Martin PLLC

(57) ABSTRACT

Methods and software assisting a user in working with images of histological sections to increase the user's productivity and decrease the need for extensive expertise in anatomy. In some embodiments, the methods include methods of assisting a user in creating a 3D volume image of a tissue block from a series of images of histological sections taken from the tissue block. In some embodiments, the methods include methods of automatedly registering a live-view or stored histological section image to a tissue block atlas. In some embodiments, the methods include methods of annotating a histological section image with information from a tissue block atlas based on user input(s) associated with the tissue block atlas. In some embodiments, the methods include methods of automatedly controlling operation of an imaging modality, such as an optical microscope, based on user input(s) associated with a tissue block atlas. These and other methods may be embodied in various configurations of software.

20 Claims, 18 Drawing Sheets
(16 of 18 Drawing Sheet(s) Filed in Color)

(51) Int. Cl.
*G06T 7/11* (2017.01)
*G06T 15/08* (2011.01)
*G06T 19/00* (2011.01)

(52) U.S. Cl.
CPC ........ *G06T 19/006* (2013.01); *G06T 2200/24* (2013.01); *G06T 2207/10056* (2013.01); *G06T 2207/20104* (2013.01); *G06T 2207/20108* (2013.01); *G06T 2207/20128* (2013.01); *G06T 2207/20212* (2013.01); *G06T 2207/30024* (2013.01); *G06T 2207/30168* (2013.01); *G06T 2219/004* (2013.01); *G06T 2219/028* (2013.01); *G06T 2219/2004* (2013.01)

(56) References Cited

U.S. PATENT DOCUMENTS

2015/0181754 A1* 6/2015 Song .................. H01L 23/4006
  361/715
2015/0272697 A1* 10/2015 Shi ...................... A61B 5/0066
  600/424
2017/0220850 A1* 8/2017 Caprioli ................... G06T 7/11
2018/0314691 A1* 11/2018 Mori ...................... A61B 5/055

* cited by examiner

FIG. 8

METHODS AND SOFTWARE FOR CREATING A 3D IMAGE FROM IMAGES OF MULTIPLE HISTOLOGICAL SECTIONS AND FOR MAPPING ANATOMICAL INFORMATION FROM A REFERENCE ATLAS TO A HISTOLOGICAL IMAGE

RELATED APPLICATION DATA

This application claims the benefit of priority of U.S. Provisional Patent Application Ser. No. 62/420,983 filed on Nov. 11, 2016, and titled "METHODS AND SOFTWARE FOR CREATING A 3D IMAGE FROM IMAGES OF MULTIPLE HISTOLOGICAL SECTIONS AND FOR MAPPING ANATOMICAL INFORMATION FROM A REFERENCE ATLAS TO A HISTOLOGICAL IMAGE, which is incorporated by reference herein in its entirety.

GOVERNMENT RIGHTS

Aspects of the inventions disclosed herein were developed under NIMH Grant No. R44-MH108053. The government may have certain rights in the inventions.

FIELD OF THE INVENTION

The present invention relates to the field of 3D image creation. More particularly, the present invention is directed to methods and software for creating 3D images from images of multiple histological sections and for making anatomical information from a reference atlas to a single or aligned series of histological images.

BACKGROUND

It is useful in biological research and other endeavors to create 3D volume images of tissue blocks using images of histological sections created by slicing target tissue blocks. Conventionally, the process of making such 3D volume images is a time-consuming process that requires a skilled technician to manually order the sections and to manually resolve problems that often occur during section processing and handling, such as tissue damage and mounting sections improperly (e.g., by flipping and/or rotating).

Biological researchers are beginning to assemble tissue block atlases, such as the Allen Mouse Brain atlas, to aid in studies of experimental tissue blocks. These atlases help experimental researchers identify anatomical structures of interest within the tissue blocks they are examining. However, using tissue block atlases is currently largely a painstaking manual process that requires experimental researchers to manually match images of their histological sections to the appropriate regions within the relevant tissue block atlas by visually comparing features within their histological section images to images of various regions within the tissue block atlas to estimate a match.

SUMMARY

In one implementation, the present disclosure is directed to a method of mapping atlas information to a histological section image of a histological section acquired from a tissue block. The method being performed by a histological section imaging system includes receiving the histological section image; executing an image-registration algorithm to register the histological section image with an atlas image of a tissue-block atlas representative of the tissue block so as to determine an atlas section image; displaying the histological section image to a user on an electronic display; displaying the atlas section image to the user on the electronic display; receiving, via a user interface of the histological section imaging system, a user input from the user indicating a selection of an anatomical region; retrieving anatomical information from the tissue block atlas based on the user input; and displaying the anatomical information on the electronic display and in association with the histological section image.

In another implementation, the present disclosure is directed to a method of controlling an imaging system to display a live-view image of a histological section in a field of view of an imaging device that is part of the imaging system, wherein the histological section is from a biological tissue block. The method includes obtaining the live-view image of the histological section from the imaging device; displaying the live-view image to a user on an electronic display; executing an image-registration algorithm to register the live-view image with an atlas image of a tissue-block atlas representative of the tissue block so as to determine an atlas section image corresponding to histological section; displaying the atlas section image to the user on the electronic display; receiving, via a user interface of the imaging system, a user input from the user indicating a selection of an anatomical region; and based on the user input, causing the imaging system to change the display of the live-view image on the electronic display.

In still another implementation, the present disclosure is directed to a method of registering a 2D histological section image to a 3D reference atlas image. The method being performed by a histological image registration system includes determining a sectioning axis for the 3D reference atlas image; executing a first image-registration algorithm to perform a first registration of the 2D histological section image to the 3D reference atlas image, wherein the first registration includes a coarse-to-fine search along the sectioning axis; executing a second image-registration algorithm to perform a second registration the refines favorable candidate positions along the sectioning axis; executing a third image-registration algorithm to perform a third registration that refines favorable candidate transforms allowing for oblique angles and scale differences due to histological processing; executing a third image-registration algorithm to perform a fourth registration that refines a best candidate image slice of the 3D reference atlas image from the third registration; and generating and storing an association of the best candidate image slice to the 2D histological section image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For the purpose of illustrating the invention, the drawings show aspects of one or more embodiments of the invention. However, it should be understood that the present invention is not limited to the precise arrangements and instrumentalities shown in the drawings, wherein:

FIG. 8 is a partial screenshot of a finalized section order UI provided by example HIC software of the present disclosure;

DETAILED DESCRIPTION

Figures 1A, 1B:
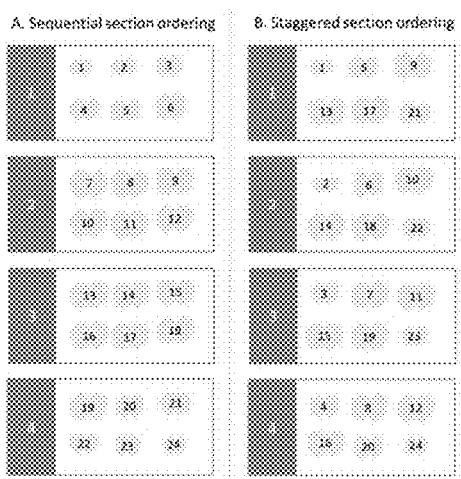
FIG. 1A is a diagram illustrating an example arrangement of histological sections from a single animal on a set of specimen slides.
FIG. 1B is a diagram illustrating another example arrangement of histological sections from a single animal on a set of specimen slides.

In one aspect, the present disclosure is directed to software and computer-implemented methods that allow a user to quickly and easily create a 3D histological image, or "3D composite histological image," from images of multiple histological sections. In some embodiments, the computer-implemented methods and software involve providing user interfaces and functionalities that allow the user to quickly and automatically identify, manipulate, and order the images of the individual histological sections for automatic assembly by the software. In other embodiments, the computer-implemented methods and software include image processing and manipulation algorithms for efficiently identifying and generating the 3D composite histological image. Such computer-implemented methods and software may also include features that allow a user to select the manner(s) in which the methods and software assemble the 3D histological image from the multiple section images. These computer-implemented methods and software may also include features that correct any one or more of various issues that can occur with a section image, such as the image being of a flipped and/or rotated tissue section, the image being of damaged tissue, and/or the image itself being defective, such as by clipping or other defect, among other issues.

Computer-implemented methods and software of this aspect provide substantial technological improvements over conventional methods of organizing histological section images for making a 3D image composed of those images. For example, conventional software does not provide graphical user interfaces that allow a user to make selections that control the processing and manipulating of histological section images on specimen slides. Nor does conventional software have algorithms that perform at least some of the images processing and manipulating automatedly to make the entire assembly and ordering process much quicker and simpler for the user, thus allowing the user to spend more time involved in substantive work, such as histological tissue analysis involving one or more of the tissue section images, the 3D composite histological image, or both.

In another aspect, the present disclosure is directed to computer-implemented methods and software for mapping atlas information for a tissue block (e.g., brain, among others), such as anatomical regions, anatomical structure names, ontological hierarchy information, and annotations, among others, and any combination thereof, to an image of an experimental histological section. Some embodiments of these methods and software automate and regularize the task of identifying and delineating anatomies under research in a histologic section. In the context of the present disclosure, an experimental section image may be, for example, a 2D image of a histological section, a 3D image of a histological slice, or a 3D image composed of multiple section images. In addition, the experimental section image may be a previously captured image or a live-view image, such as a live-view microscopy image. The display of anatomical information from a tissue-block atlas may result from any one of user interaction with a displayed experimental section image, user interaction with a displayed atlas image, and user interaction with a graphically displayed ontological hierarchy of anatomical regions of the tissue block under consideration. When a live-view experimental section image is the subject, onscreen navigation within a displayed atlas image, (e.g., atlas section image registered to the experimental section image, and/or with a graphically displayed ontological hierarchy) can be used to control a microscopy system providing the live-view experimental section image. Aspects of the microscopy system that may be controlled include magnification power, stage position, and focus. The foregoing and other aspects of the present innovations are described below in detail.

In the examples used herein, the histological sections are of mouse brains. However, the histological sections that can be handled by computer-implemented methods and software of the present disclosure can be of any anatomical feature or combination of anatomical features of virtually any living organism. For examples, the feature(s) at issue may be an organ, a portion of an organ, multiple organs, a bone, multiple bones, a combination of one or more bones with one or more organs, etc., among many others. Fundamentally, there is no limitation on the nature and/or type of anatomical feature(s) from which the histological sections are made.

3D Histological Image Construction Software 3D histological image construction (HIC) software of the present disclosure comprises software and computer-implemented methods that perform automated three-dimensional (3D) construction of image volumes from serially sectioned tissues. Its ability to align series of histological sections through an organ or tissue sample and create a 3D image volume at the resolution of scanning addresses a common problem in histological tissue analysis, namely, that 3D anatomic context is largely lost when tissue is cut into sections and placed across several slides. By combining the abilities to examine thin and thick serial sections with high resolution microscopy while maintaining 3D structural reference, the HIC software enables both detailed and high-level observation of tissues and organs.

At a high level and in one embodiment, the HIC software and computer-implemented methods involve receiving input images of the histological sections, segmenting the input images to produce a set of section images, ordering the set of section images, registering the ordered section images, and constructing an image volume from the registered section images into a 3D composite histological image. Each of these steps is described below. Those skilled in the art will readily appreciate when the HIC software is running on a computing system, such as computing system 2812 of FIG. 28 or computing system 2900 of FIG. 29, among others, the HIC software effectively turns the computing system into an HIC apparatus. In some embodiments, such an HIC apparatus may include one or more suitable imaging devices that create the input images, while in other embodiments the HIC apparatus does not include any imaging devices, with the input images being obtained from one or more unaffiliated imaging devices.

Receiving Input Images

Figure 2:
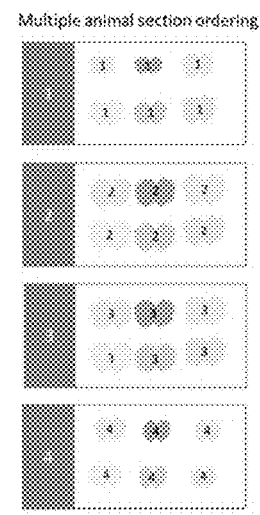
FIG. 2 is a diagram illustrating an example arrangement of histological sections from multiple animals on a set of specimen slides.

The input images are typically a series of 2D images of histological sections resulting from microscopy scanning of one or more entire specimen slides. That said, the input images can also be a series of 3D images of the same histological sections, or 3D images from other sources such as a magnetic-resonance microscope, a 2-photon microscope, or a light sheet (e.g., selective plane illumination microscopy (SPIM)) microscope. As those skilled in the art will readily understand, each input image originating from serial sections is typically composed of multiple fields of view acquired at relatively high magnification and, when multiple histological sections are mounted on a single slide (which is typically the case where tens or more of sections are involved), multiple section images will be present within a single slide image. When each slide contains multiple sections, the ordering of the sections on the slide can vary based on sectioning protocol or lab practices. For example, the ordering may place adjacent serial sections from the tissue sample side-by-side in rows or columns on the slide (sequential ordering, see FIG. 1A that shows an example in which 24 histological sections are distributed across four specimen slides), or the ordering may spread adjacent serial sections from the tissue sample across multiple slides (staggered ordering, see FIG. 1B, that shows an example in which 24 histological sections are distributed across four specimen slides). As another example, sometimes histological sections from multiple tissue samples from the same or different animals may be placed on the same slide. FIG. 2 illustrates an example in which four histological sections from each of six different brains are arranged across four slides.

Figure 3:
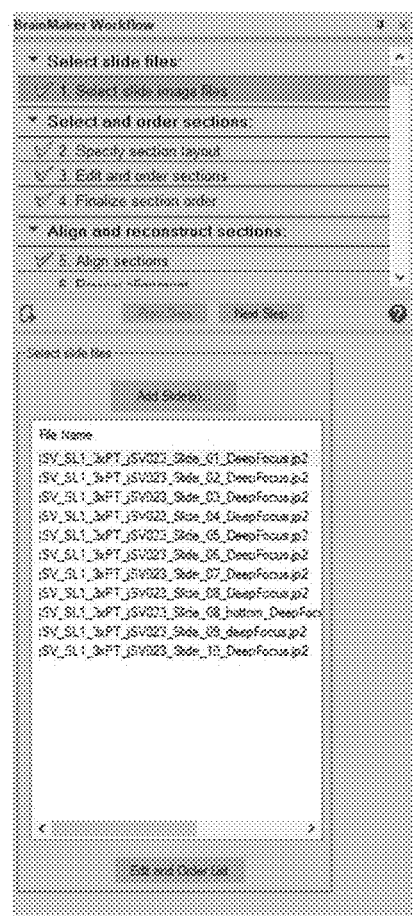
FIG. 3 is a screenshot of a user interface (UI) of example histological image construction (HIC) software of the present disclosure.
Figure 4:
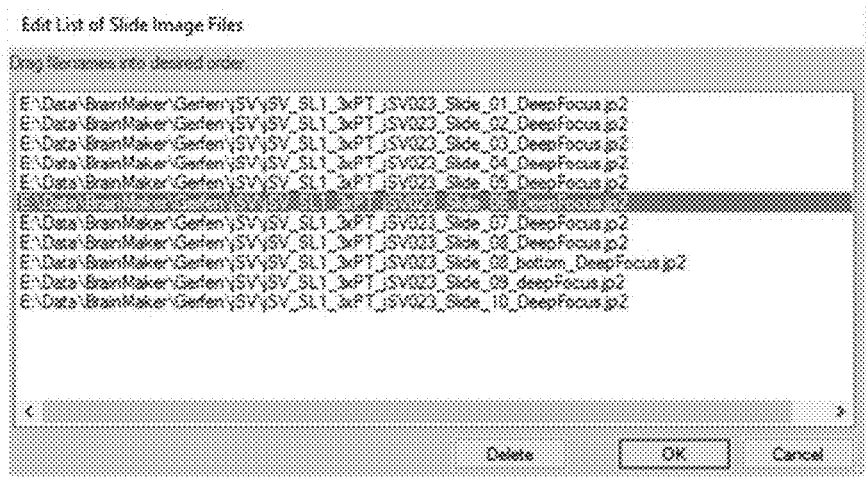
FIG. 4 is a screenshot of a pop-up window that the HIC software of FIG. 3 may display when a user selects the "Edit and Order List" soft button control in the UI of FIG. 3.

The HIC software may receive the input images in any suitable manner, such as being imported from a datastore and/or by contemporaneous microscopy scanning, among many others. FIG. 3 illustrates an example user workflow manager interface U(I) that HIC software may provide for manipulating image files containing input images. This workflow manager UI allows a user to work through and control various steps of the workflow needed for the HIC software to construct an image volume from a set of input section images. As seen in FIG. 3, in this screenshot the workflow step selected is the "Select slide image files" step. FIG. 4 illustrates an example pop-up window that HIC software may display when a user selects the "Edit and Order List" control (soft button) in the workflow manager UI illustrated in FIG. 3. In this example, the pop-up window of FIG. 4 allows a user to order and delete the individual image files containing the input images.

Segmenting the Input Images

In one embodiment, the HIC software allows a user to step through each input image to view that image in order to determine, for example, whether or not the automatic segmenting and ordering features of the HIC software, to the extent implemented, have properly identified the individual section images and properly ordered them. In the context of this disclosure, the term "segmenting" and like terms means the identification of individual section images from the background (e.g., portions of an input image from empty portions of a slide) and/or from other sections images in the input image (e.g., in the case of a slide containing multiple section images).

In the present example, segmentation and ordering of section images occur in conjunction with workflow steps 2 through 4 shown in the workflow manager UI interface illustrated in FIG. 3. In one embodiment, when a user selects an input image for HIC software to display in conjunction with segmentation and ordering, the HIC software displays that image and performs segmentation algorithms on that input image to identify the individual section image(s) within the input images. In some embodiments, the algorithms display an outline line around each section image that the HIC software identifies so that the user can see whether or not the automatic segmentation algorithms have indeed properly identified each section image.

Segmentation separates a region of interest (foreground (e.g., a section image)) from the rest of an image (background (e.g., empty portion of a specimen slide)). In the present context, histological tissue samples are typically quite visually distinct from the clear background of a specimen slide. However, illumination and tissue stain variation (e.g., brightfield illumination versus fluorescence) makes single-valued-threshold segmentation unreliable. In one embodiment of the HIC software of the present disclosure, the segmentation algorithms perform segmentation based on a gradient magnitude computation that includes a derivative scale that can be tuned to the sharpness of the boundary between the foreground and background. In some embodiments, the algorithms include a smoothing scale that can be tuned to the size of the texture in the particular tissue of the section images. The segmentation algorithms then threshold the gradient image to identify its boundary and then, as mentioned above, display a line onscreen that identifies the boundary. In some embodiments, the segmentation algorithms use the binary morphology to clean up the segmentation, for example, to fill holes to account for gaps or uniform regions inside tissue, to erode to counter effects of smoothing on the boundary of the region, and to automatically remove regions that are very small.

This approach to segmentation is quite good at separating tissue regions from the background. Sometimes multiple histological sections are too close to each other such that the segmentation merges the sections together into a single section. In some embodiments, the HIC software includes a splitting algorithm that automatically recognizes and splits merged or touching section images. In one example, the splitting algorithm is based on the observation that when two section images are merged or touching, the space between the two section images is narrow and the boundaries typically pinch together, generally forming a V-shape, with the vertex of the V-shape located where the boundaries merge. In this example, two distances are measured, a Euclidean distance, $L_E$, between two points on the boundaries and the path-length distance, $L_p$, along the boundaries between the same two points. The ratio $L_p/L_E$ is large for a pair of "pinch" points. In the splitting algorithm, this ratio is computed for multiple point pairs along the boundaries, and if the ratio is large enough (e.g., greater than 13.33 in one embodiment), the merged regions are split into two section images.

Ordering the Section Images

The image sections that the HIC software identifies in the segmentation process need to be properly ordered in the sequence that the corresponding histological sections were taken from the tissue for which the image volume is going to be constructed. (Sometimes, this is called "reconstruction" because it is in a sense reconstructing the tissue volume, but in the form of section images rather than the actual sections themselves.) As noted above, histological sections of relatively large bodies of tissue, such as an entire organ (e.g., brain) or portion of an organ, are often mounted on a series of specimen slides in a particular arrangement, such as the sequential or staggered arrangement described above relative to the input images. In the present example, the HIC software includes an image-input UI (see FIG. 5) that allows a user to make various selections and/or provide certain inputs regarding input slide images so that the HIC software can perform various functions, such as section recognition and section ordering, automatically over all of the input slide images. The HIC software may display the image-input UI of FIG. 5 in response to a user selecting item (or step) 2 ("Specify section layout") in the workflow manager UI of FIG. 3.

Figure 5:
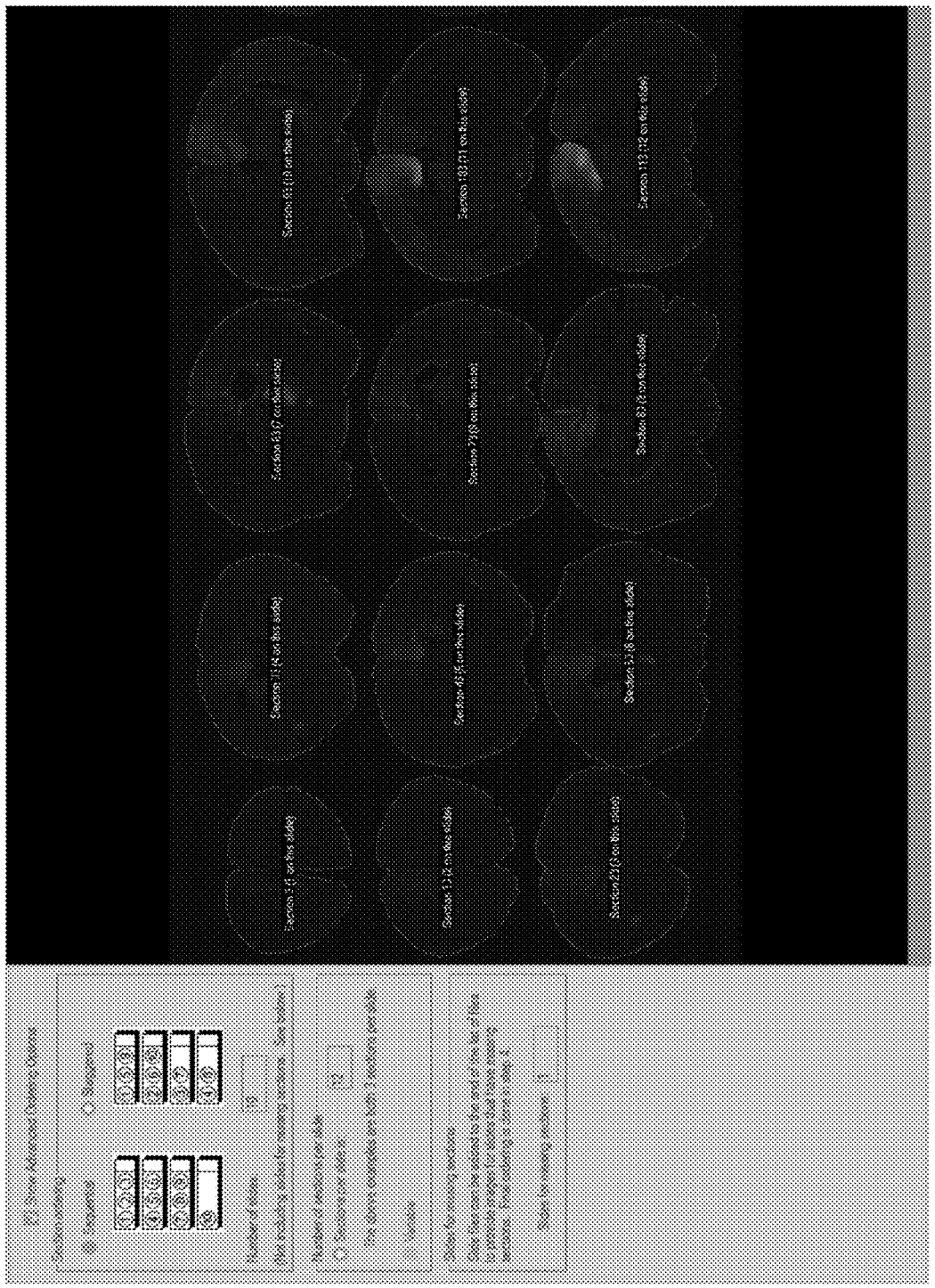
FIG. 5 is screenshot of an image-input UI provided by example HIC software of the present disclosure.

As seen in FIG. 5, the example image-input UI shown includes three input regions (generally located in corresponding boxes on the left-hand side of the screen). The top input region on the left allows the user to select whether the section ordering for the current ordering operation is sequential or staggered and to input the number of input slide images in the series of slides. In the example shown, the staggered option is shown as being selected, and the number of input slide images is 10. Depending on how the slides were processed during the histological section acquisition phase, they may have either a fixed or variable number of histological sections per slide. The middle input region on the left of image-input UI of FIG. 5 allows the user to indicate to the HIC software the pertinent case for the current ordering operation. If the user selects the "Sections per slide is:" selector, the user also inputs the number of section images per input slide image.

Figure 7:
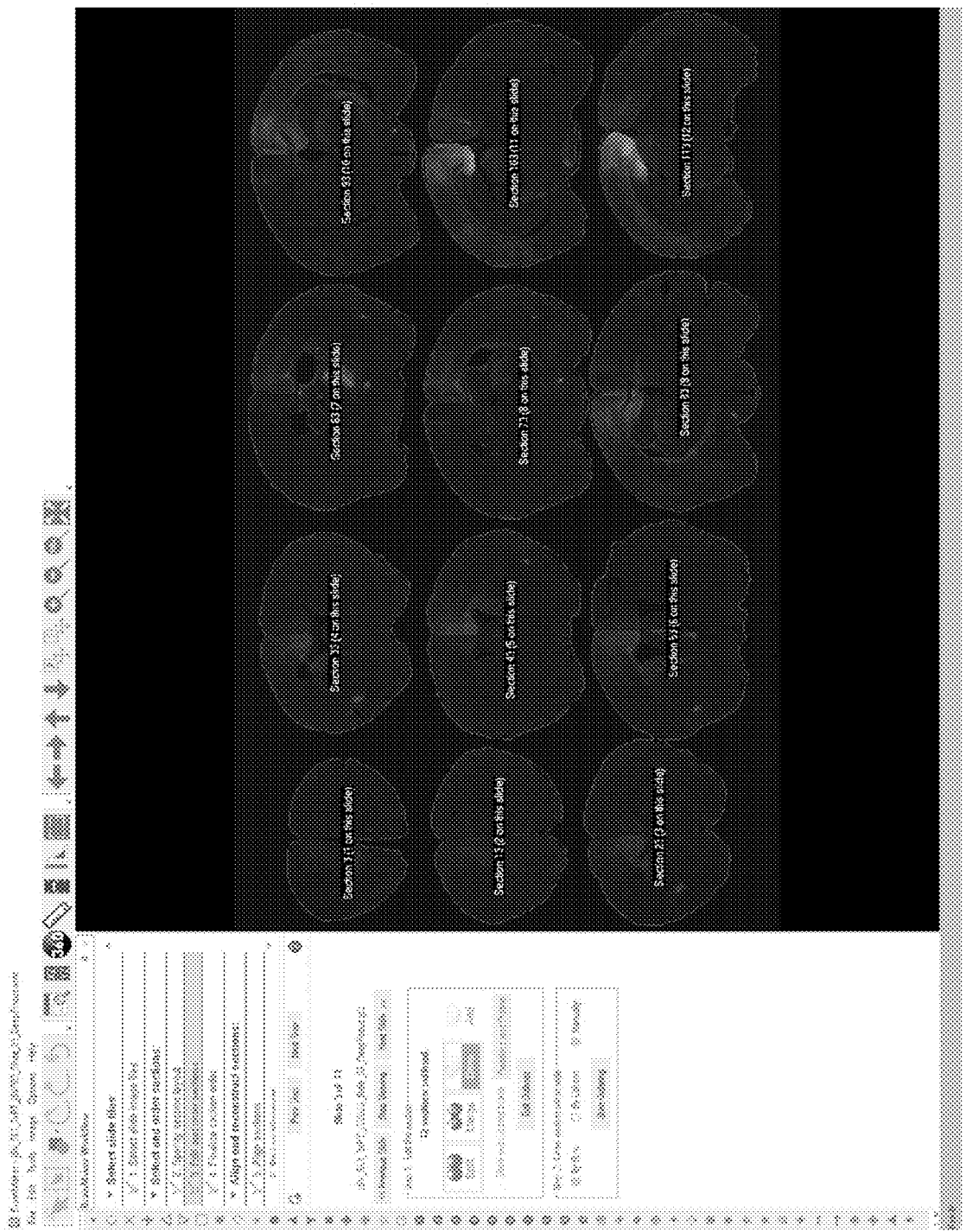
FIG. 7 is a screenshot of an image editing and ordering UI provided by example HIC software of the present disclosure.

In this example, the HIC software uses the information input into the top and middle input regions on the left and in the image editing and ordering UI of FIG. 7 (in the case of ordering "by column" and "by row" to control the operation of algorithms that process each input slide image to automatically recognize the individual section images in that input slide image and to identify and label each individual section image on that input slide image).

As can be seen in the illustrative examples, multiple tissues sections are often arranged in a grid on a slide. Due to varying expertise in performing histological processing techniques, this grid can be rough, with placement being fairly inexact relative to the grid. In the embodiment illustrated, the HIC software may perform an automatic grid sequencing for section image ordering to prevent users from having to manually order each section. In this example, the position of a section image within a particular slide image is represented by its centroid location (e.g., x,y coordinate location), and the HIC software determines a median radius of the section image (sqrt(area/pi)). The HIC software determines column-major section images by sorting section images by centroidal x-location, choosing the left most, finding section images that are within the mean radius in the x-direction, sorting section images by centroidal y-location—this is the first column, and repeating with the remaining section images.

Figure 6A:
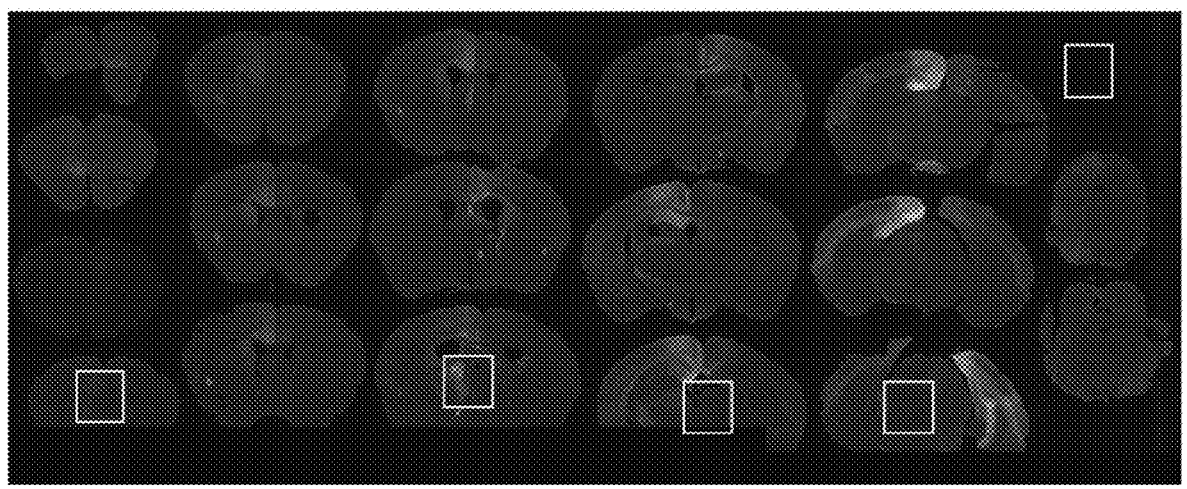
FIG. 6A is a screenshot of the display window of the image-input UI of FIG. 5 showing an input slide image and placeholder indicators generated by the HIC software to indicate missing and defective section images.
Figure 6B:
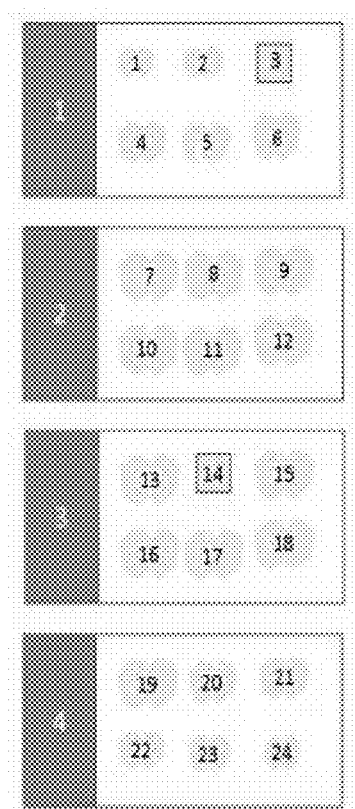
FIG. 6B is a diagram illustrating the missing section images of FIG. 6A in a set of 24 section images arranged in a sequential manner across four input slides.
Figure 6C:
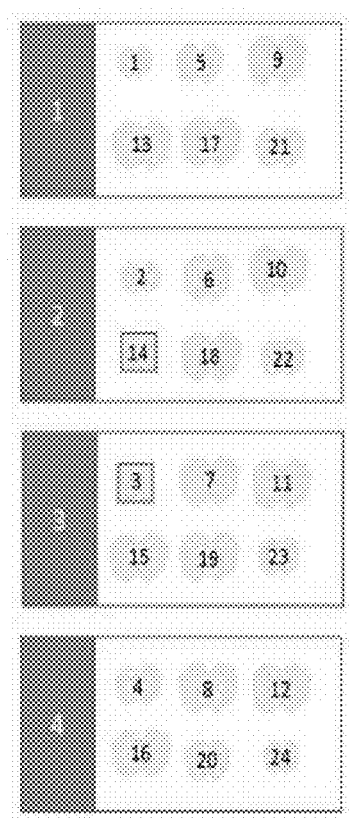
FIG. 6C is a diagram illustrating the missing section images of FIG. 6A in a set of 24 section images arranged in a staggered manner across four input slides.

Automatic recognition of the individual section images on an input slide image by the HIC software is illustrated in the image display portion of the screenshot of FIG. 5 (right-hand side) by the visual outlining of each of the section images on the input slide image as described above. In the case of missing and incomplete section images, the HIC software can also identify such images and identify a placeholder indicator for each for use in the final section image ordering phase described below. FIG. 6A shows an example in which each placeholder indicator is a rectangle. As described below, if the HIC software is working with one of the standardized ordering schemes (e.g., serial or staggered), it automatically identifies each placeholder indicator based on its location in the ordering. In this manner, a user can readily identify the placeholders for final ordering and manipulation of the section images. This is described below in detail. FIG. 6B illustrates an example in which section images 3 and 14 are missing in an ordered series of 24 section images across four input slide images when the section images are arranged in a serial manner. Relatedly, FIG. 6C illustrates an example in which section images 3 and 14 are missing in an ordered series of 24 section images across four input slide images when the section images are arranged in a staggered manner.

Automatic identification and labeling by the HIC software is exemplified in the image display portion of the screenshot of FIG. 5 by labels overlying each section image, here, "Section 3 (1 on this slide)" at the upper left-hand section image through "Section 113 (12 on this slide)" at the lower right-hand section image. In this example, the section (image) number is the section (image) number in the overall sequence of slides (slide images) (the slide image shown in the slide image of the third out of the twelve slide images) and the parenthetical section (image) number is the number of the section (image) on the currently displayed slide (image).

The bottom input region on the left-hand side of the screenshot in FIG. 5 allows the user to identify the number, if any, of input slide images that each contain one or more section images corresponding to section images either missing from the slides identified in the top input region on the left or are unusable, such as due to damage to the original histological image placed on the series of slides. During preparation of a slide, it is sometimes the case that a histological section gets misplaced or damaged (torn, folded, etc.) to the point it is unusable. In some cases of damage, a damaged section may be left off of a slide or it, or portions of it, may be left on the slide. In other cases, a tissue section may not be damaged but rather incompletely scanned or otherwise not properly imaged. In any of these cases, substitute section images can be provided to the HIC software using the bottom input region on the left.

FIG. 7 illustrates an image editing and ordering UI that the HIC software may display when a user has selected item (step) 3 ("Edit and order sections") in the workflow manager UI of FIG. 3, which is also shown in the upper left of the screenshot of FIG. 7. As seen in FIG. 7, the image editing and ordering UI allows a user to navigate among multiple input slide images via "Previous Slide", "Stop Viewing", and "Next Slide" selectors. It also allows a user to edit each section image and outline in a variety of ways, for example by splitting a section image into two section images (e.g., if section images are touching or otherwise too close to one another), merging two section images (e.g., if the HIC software has improperly identified tissues pieces from a single section image as two separate images), adding a section image, allowing a user to draw a crop box in the image display window and to select to redetect an outline an identified section image, and allowing the user to edit an outline of a desired section image. In addition, the image editing and ordering UI allows the user to select the manner in which the HIC software orders the section images within the displayed slide image, here, by row, by column, or manually. In the cases of serial and staggered ordering as described above, the HIC software uses the by-column or by-row ordering to automatically identify and label the section images on the currently displayed slide, here slide 3 of 11 as noted in the image editing and ordering UI.

To create a series of section images from each slide image, the HIC software uses the contour(s) it draws around each section image to determine a crop-box sized to completely contain the image region(s) as defined by the contour(s). The HIC software then stores each cropped section image in a distinct image file and causes these section image files to be ordered in serial order using the selected ordering information described above. In some embodiments, the resolution, and hence file-size, of the stored section images is limited in order to limit storage space and to maximize the speed of processing. In one example, the resolution is limited to 1,000 pixels×2,000 pixels, but other resolutions can certainly be used. The present inventors have found that the image registration techniques described herein typically work very well using these limited-resolution images.

Figure 8:
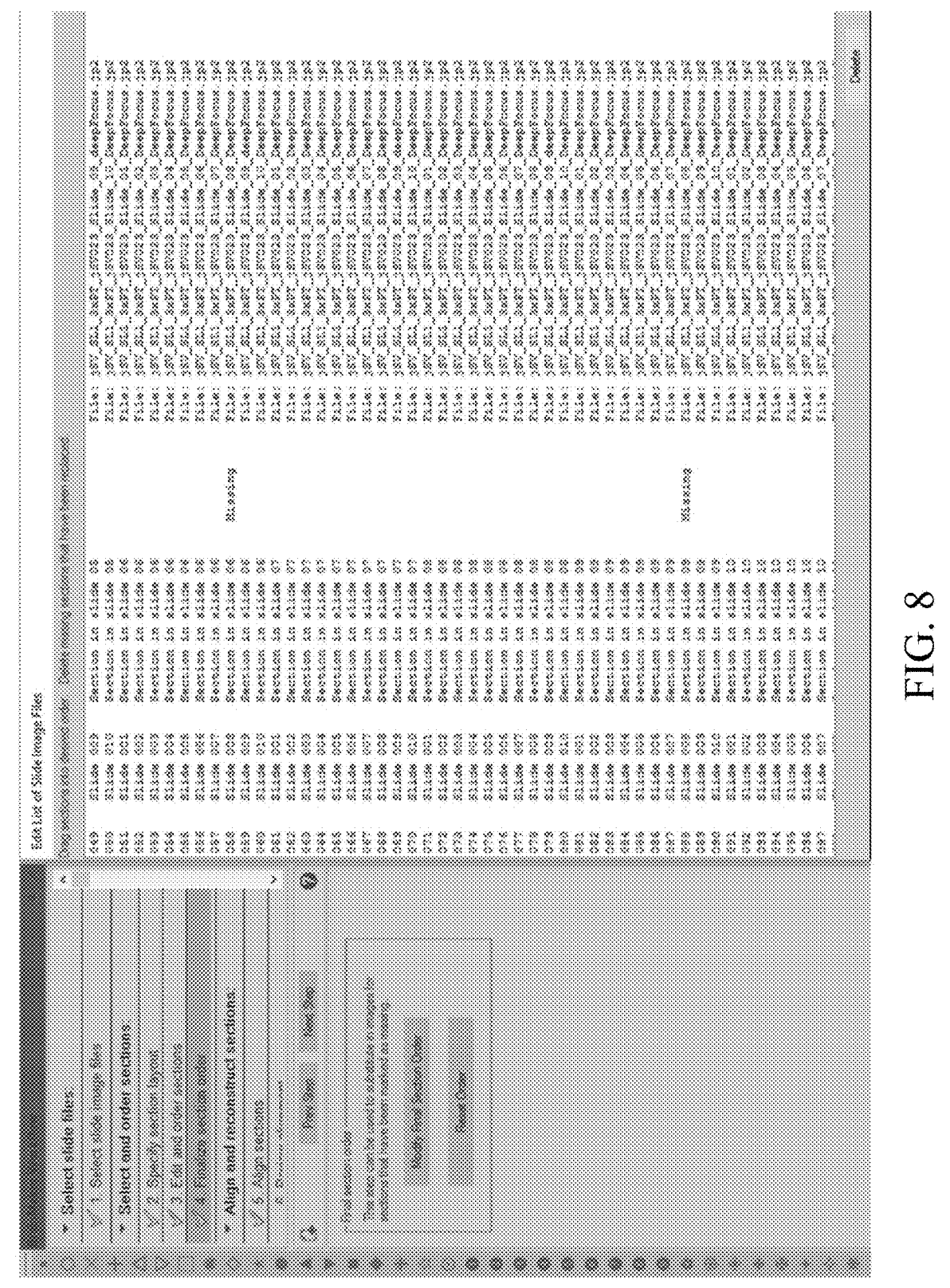

FIG. 8 is a screenshot illustrating a finalize section order UI for item (step) 4 ("Finalize section order") of the example workflow represented in the workflow manager in upper left of the screenshot of FIG. 8. In this example, the finalize section order UI includes a "Modify Final Section Order" control that allows a user to organize the final order of the section images prior to the HIC software registering adjacent ones of the section images and creating a 3D image of the ordered and registered section images. The HIC software lists the section images in ascending numerical order in the overall sequence of section images (e.g., as generated automatically via steps described above or as created manually). In this example, the HIC software also identifies each missing section image and identifies the locations of the individual section images within the input slide image files. In this connection, the HIC software keeps a table of section image locations within the input slide image files according to the selected section image layout in the slide images and the on-slide ordering (e.g., by column or by row), described above. Dragging section image identifiers in finalize image order UI also includes dragging section images from missing section slides. Other functions the HIC software can allow a user to perform include deleting section images (not illustrated, but, e.g., via a "right-click" operation or dragging and dropping to a virtual waste basket) and resetting the order via a "Reset Order" control. Once the user has confirmed or set the final order, the HIC software can register the section images with one another. After an ordering schema (manual or automatic) is established, the HIC software updates and maintains section order based on steps 2-4 in the workflow manager UI (e.g., FIG. 8, upper left). If a user drags a section (i.e., re-ordered) in step 4, all other section positions (indices) are updated according to section ordering layout (i.e., by staggered, sequential, and then row, column) (e.g., for sequential ordering if section 7 is moved to position 3, section 7 becomes section 3 and section 3 becomes section 4).

Serially Registering the Section Images

The present inventors have developed techniques that effectively reassembles, in the form of visible light images, a 3D object from a series of 2D sections using a combination of information from multiple sources at multiple scales, including symmetry, shape, and image content of the individual section images as well as agreement of the assembled volume to a 3D model. This multiple stage approach is tailored to address problems specific to 3D reconstruction from 2D histological tissue section images, such as automatically determining when a section has been flipped during preparation or handling tissue that is damaged during sectioning. This approach also provides the flexibility to select between fast and coarse reconstructions and slower but more accurate reconstructions.

Briefly, when tissue is sectioned orthogonal to a symmetric plane (e.g. the midsagittal plane), identifying and aligning the symmetric axis in all section images provides a fast, coarse approximation to the 3D object that is robust to damaged tissue. Incorporating shape information into the alignment of adjacent serial section images provides another fast alignment that can also provide a rough reconstruction in the absence of a symmetric axis (but this stage is sensitive to damaged tissue). Incorporating image content provides a further refinement that better aligns interior structures in the sections. Either or both section shape and image content can be used to create multiple hypotheses that can be tested to determine whether a section has been flipped during histological processing. In addition, if a 3D model of the object being reconstructed exists (e.g., a 3D image of the object at issue or a similar object generated by magnetic resonance imaging), this can be used to inform the shape of the serial section reconstruction. This process has the potential to produce the most anatomically accurate result.

In the present embodiment, the HIC software uses multi-scale image registration that utilizes image symmetry, overall image shape, and image content to compile serial sections into a 3D volume. The HIC software uses multiple stage, multiple resolution registration algorithms for each adjacent pair of section images in properly ordered series of section images, for example, as generated using section-ordering processes described above. The present inventors have found that the registration algorithms used herein are particularly suited for the HIC software due to the general observation that, typically in this field, the appearance of serial sections varies slowly through the tissue under consideration such that a good estimate for the 3D structure is given by aligning reasonably adjacent pairs of images. In general, the registration process that the HIC software performs in this example operates on down-sampled versions of the section images. This is beneficial because full-resolution images may not fit into memory, image registration is computationally intensive, alignment of section images at a coarse resolution is sufficient for most cases, and registration is computed in physical space—the transform parameters are independent of the image pixel spacing.

In one example, a serial registration process that the HIC software performs starts with a first pair of section images in the ordered series of section images, and the first section image is the fixed image (a/k/a "reference" or "source") while the second section image is the moving image (a/k/a "subject" or "target"). The HIC software performs an initial translation transformation that aligns the centroids of the fixed and moving images. Following this initial translation, the HIC software performs a first registration stage that aligns the coarse shapes of the fixed and moving images. The HIC software performs the registration by operating on down-sampled versions of the image masks corresponding to the fixed and moving images from the section image segmentation described above. In one example, this first registration stage utilizes a mean squares image metric and a centered rigid transform based on center of rotation, angle of rotation, and translation.

Following the first registration stage, the HIC software performs a second registration stage that aligns image content of the fixed and moving images. This stage operates on the images themselves and can be performed at one or more suitable resolutions that may depend on the features present in the images. In one example, the second registration stage utilizes a normalized correlation image metric that is appropriate for comparing images of the same modality but with a possible scalar difference in intensity. The second registration stage may use a centered rigid transform.

The HIC software may include algorithms for automatically handling flipped sections in the image registration process. With float mounting of tissue sections on a specimen slide, tissue sections are placed in a liquid as they are cut from the tissue block and then picked up and mounted on a specimen slide. Individual tissue sections may flip over during this process, thus being a mirror of actual orientation of the tissue section about its secondary axis. Even when sectioning tissue normal to a plane of symmetry, it can be difficult to get perfectly symmetrical tissue sections. Algorithms of the HIC software may be configured to exploit such asymmetry to correct for flipped sections. For example, the algorithms at either the first registration stage or the second registration stage can include algorithms for executing that registration stage both with and without performing a transform that mirrors the section image about its secondary axis, evaluating an image comparison metric, and basing the registration on the best result.

The HIC software may also include algorithms for performing symmetric axis registration. The registration steps described above are sensitive to damaged tissue. Depending on the degree of damage, the fixed and moving images may look very different from one another such that aligning the centers of the sections yields a poor initial registration and further optimization does not recover from the poor registration. To handle this when tissue sectioning is normal to a plane of symmetry (e.g., the midsagittal plane), the HIC software can use symmetry expected in the section image(s), for example, in conjunction with the first registration stage described above. A reflection transform has a center and an axis of reflection, and the HIC software can initialize the axis of reflection as the second principle axis of the image mask. Then, the HIC software may register a section image with itself using the reflection transform to refine the parameters of the symmetric axis. If this operation fails, the HIC software may prompt the user to initialize the symmetric axis. The HIC software provides the initial image registration by aligning the symmetric axis of the fixed and moving images.

The HIC software performs the relevant registration steps for subsequent overlapping pairs of adjacent section images until the HIC software has performed the registration processing for all adjacent pairs in the entire series of section images. For example, starting with the first and second section images in the ordered series of images as, respectively, the first fixed image and the first moving image, the HIC software may register the second section image and third section image by processing them, respectively, as the second fixed image and the second moving image. Such processing may continue until the HIC software has registered all of the section images in the ordered series. The registration processing may be performed in a different manner, such as, for example, by starting with section images in the middle, or other location, of the ordered series, orienting the entire volume accordingly, and performing registrations in each of the two directions away from the selected location. It is noted that the transform that aligns the last section N to the first section can be found by composing all pairwise transforms from the first section up to section N. In other words, the composite transform for section N involves first applying the pairwise transform that aligns section 2 to 1, followed by the pairwise transform that aligns section 3 to 2, etc., finally incorporating the transform that aligns section N to N−1. Because of this, a change to a transform in the beginning of the series of section images affects the composite transforms of all sections later in the series.

Figure 9A:
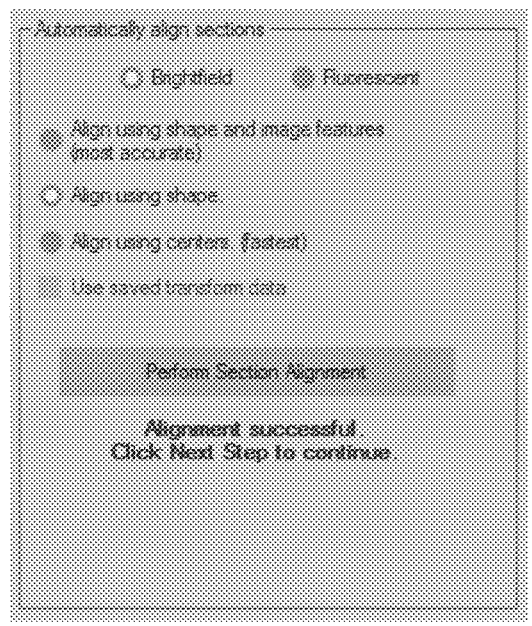
FIG. 9A is a screenshot of a registration process control UI provided by example HIC software of the present disclosure.

In the present embodiment and as seen in FIG. 9A, the HIC software includes a registration process control UI that allows the user to control various aspects of the automatic registration process. In the example registration process control UI of FIG. 9A, the HIC software automatically detects and allows a user to select the microscopy modality of the section images, either brightfield images or fluorescence images. The HIC software uses the image type to determine whether image feature matching assumes either dark biologic features (including the entire section, which is relevant to the second two options) on a brightfield background or bright fluorescent features on a dark background. The HIC software also allows the user to select the type of image registration performed via a set of radio button controls. In this example, the HIC software has three radio button controls that allow the user to select an image registration option from among three corresponding registration options ranging from a most accurate but most computationally intensive option ("Align using shape and image feature.") to a less accurate but least computationally intensive option ("Align using centers."), with an intermediate accuracy/intensity option ("Align using shape.") between the other two options. The user can utilize these options in any suitable manner. For example, if the section images are well defined, highly symmetrical, and precisely oriented (e.g., relative to rotation) such as from an automated tissue processor, the user may deem the quickest "Align using centers" option as the best initial choice, and have the HIC software perform the registrations using the corresponding registration algorithms. The user can view the results and, if they are acceptable, simply use those results.

However, if the results are not acceptable, the user may select one or the other of the other two options so that the HIC software performs the registrations using the algorithms corresponding to the new selection. If the user decides to have the HIC software rerun the registration, then the user can, if desired, select the "Use saved transform data" selector. When selected, the HIC software uses transform data saved after a prior execution of registration algorithms. If a registration process has not yet been performed, the "Use saved transform data" option is "grayed-out" (illustrated), i.e., not user selectable, because there simply is not yet any saved transform data. If the HIC software uses saved transform data, the HIC software can typically reach a solution more quickly than when it does not used saved transform data. The registration process control UI of FIG. 9A also includes a "Perform Section Alignment" control that allows the user to cause the HIC software to initiate the selected automatic registration process. Also included in the example registration process control UI of FIG. 9A is a notification region beneath the "Perform Section Alignment" control that notifies the user about the registration process. Here, the notification region indicates that the automatic alignment using the selected shape algorithms was successful and instructs the user to select the "Next Step" control in the workflow manager UI as seen, for example, in the upper left-hand corner of the screenshot of FIG. 8.

Manual Editing

Figure 9B:
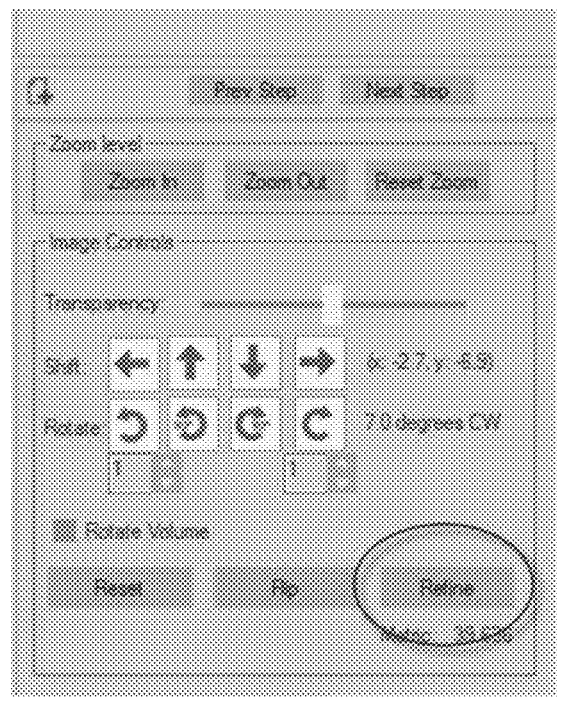
FIG. 9B is a screenshot of a manual editing UI provided by example HIC software of the present disclosure.

The HIC software may include manual editing capabilities that allow a user to correct or improve the results of the automatic registrations described above. In the present embodiment, the HIC software may allow the user to adjust the component of the section-to-section transforms. For example, the user may overlay the fixed and moving images with transparency, apply the fixed image's composite transform, apply the moving image's composite transform, and adjust the reflection and rigid transform for the moving image. Based on any manual editing, the HIC software updates the image comparison metric to provide feedback on how good the alignment is. As seen in FIG. 9B, in the present embodiment, the HIC software includes a manual editing UI that allows a user to perform various operations, such as shift, rotate, and flip operations, in an effort to assist in registering section images with one another. After the user has performed the desired image manipulations and corresponding transforms, the user then selects a "Refinement" soft button that causes the HIC software to execute the algorithms for the last stage of image registration, i.e., the actual image registration, for pairs of images starting from the user-specified transform. A user can use the image comparison metric to quickly step to problem section images. When moving to another pair of section images, the HIC software automatically updates the collection of composite transforms. Additionally, the final composite transform's rotational value for all section pairs can be manually adjusted by entering a section number and placing a check in the checkbox labeled "Rotate Volume". This is useful when orienting anatomic features such as the midline are not visible in the early sections of the series.

Constructing the 3D Volume Image (Reconstructing the Tissue Block)

In the present embodiment, the HIC software automatically creates a full-resolution 3D volume image, effectively reconstructing the tissue block. The HIC software performs the image registration by operating on down-sampled section images but performs the registration in physical space. This means that the registration parameters are independent of the image spacing used to create them. Individual section images may be too large to fit into memory at one time, not to mention an entire 3D volume image fitting into the same memory. In one example, the HIC software uses the JPX image format, which is a 3D image file format. The images are stored in multiple 2D planes, the planes are divided into blocks, and the blocks are compressed with 2D wavelets. This provides 1) a high compression ratio while preserving high quality, 2) multiple resolutions represented in the image file, 3) fast access to the 2D regions of interest, either wide field of view at a low resolution or small field of view at a high resolution, and 4) a format that is amenable to web streaming.

In one example, the HIC software assembles the 3D volume image one section image at a time, one block at a time. The first section image in the ordered series defines the reference frame for the output volume, and the spacing between the sections of the images determines the Z-coordinate for each section image. The HIC software determines the size of the output volume by transforming the corners of each section image to the output reference frame and computing maximum extents in all dimensions. For each block in the output 3D volume image, the HIC software transforms corners of the block to find the region of the input section image, loads that region of the input section image plus some padding, resamples the input section image with the transform, and writes pixel values into a corresponding output image block.

Figure 10:
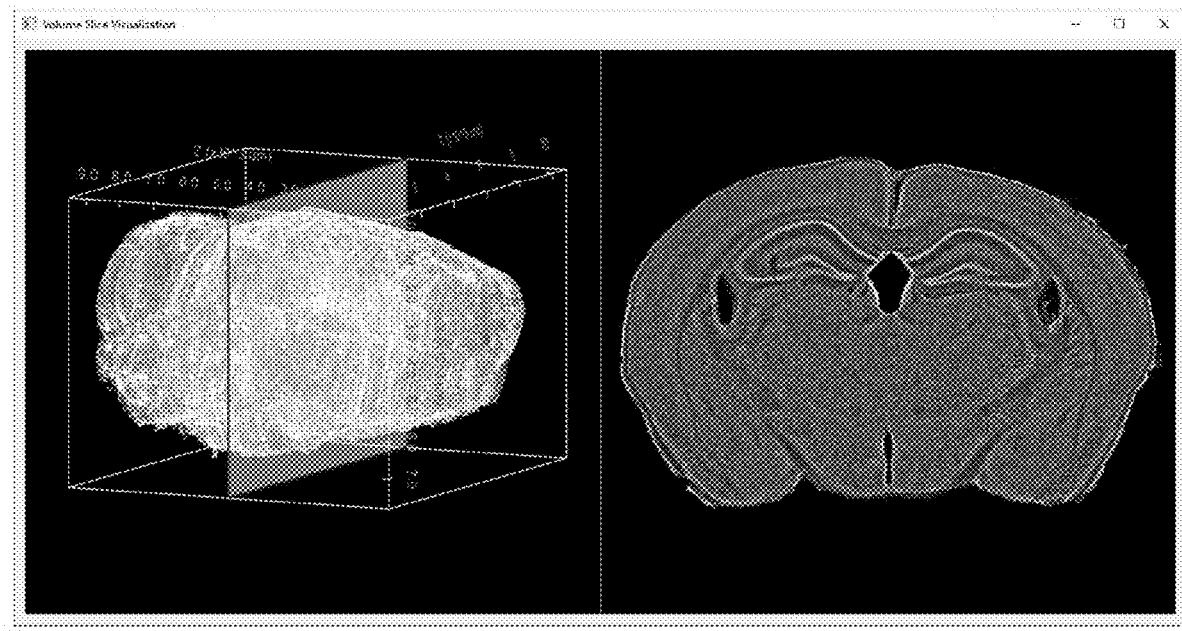
FIG. 10 is a screenshot of a volume slice visualization UI provided by example HIC software of the present disclosure showing a full 3D isometric view of the constructed volume on the left and a section image on the right, wherein the section image is located at the plane through the constructed volume.
Figure 11:
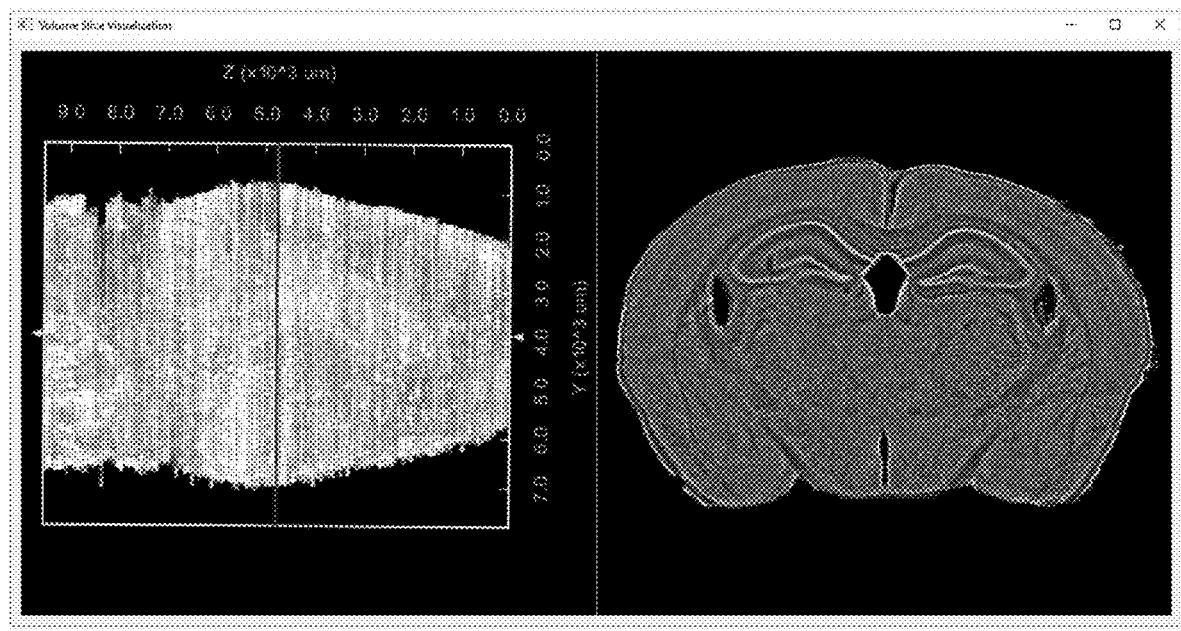
FIG. 11 is a screenshot of the volume slice visualization UI of FIG. 10, showing a full planar view on the left and a section image on the right, wherein the location of the section image is indicated by the line-marker in the full planar view.

FIGS. 10 and 11 show a volume slice visualization UI illustrating several visualizations of a constructed 3D volume image of a mouse brain. The visualizations on the left-hand sides of FIGS. 10 and 11 are, respectively, a full 3D isometric view of the mouse brain and a full planar view of the mouse brain, whereas the right-hand sides of both figures show the same section image, namely, the section image present at the plane indicated in each of the isometric and planar views of the corresponding figure. As can be seen on the left-hand side of FIG. 10, the location of the section image on the right-hand side of FIG. 10 is identified by the plane that cuts through the full 3D isometric view at about $4.8 \times 10^3$ μm. The full planar view on the left-hand side of FIG. 11 shows the same location of the cut plane at about $4.8 \times 10^3$ μm.

Anatomical Information Mapping Software

The Problem

Figure 12:
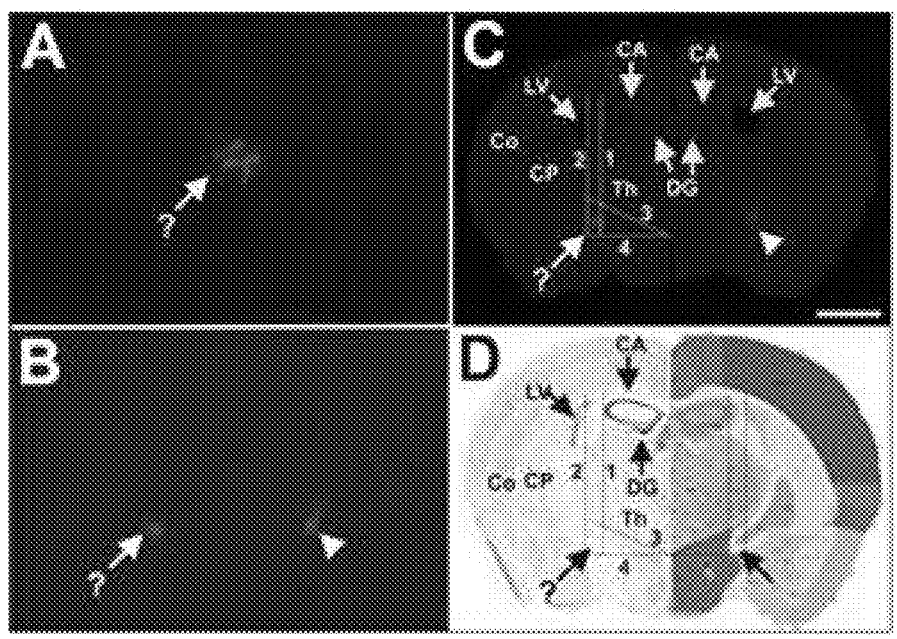
FIG. 12 is a composite of four image panels, A through D, illustrating the challenge of identifying a distinct region in a mouse brain by inspecting a coronal section of the brain under a fluorescent light microscope.

A fundamental problem in day-to-day work in basic neuroscience is the correct identification of distinct regions in the brain while inspecting histologic sections under a light microscope. This fundamental problem, that is, the need to correctly identify brain regions, is illustrated in FIG. 12. It is noted that panels of FIG. 12 are taken from the GENSAT project [5,28]. Images in panels A to C were provided by Dr. Charles R. Gerfen (Lab. Systems Neurosci., NIMH, Bethesda, Md.). The image in panel D was taken from the Allen Mouse Brain Reference Atlas. The scale bar in panel C represents 500 μm in panel A and 2 mm in panels B and C.

Panel A of FIG. 12 shows a distinct region in the brain of a certain Cre-driver mouse (arrow and question mark) in which a fluorescent reporter signal was found (red color; section counterstained with fluorescent Nissl stain [blue color]). The question is: in which brain region the reporter signal was found (i.e., where are the neurons at the adeno viral vector injection site within the cerebral cortex project in the brain1)? Panel B of FIG. 12 displays a low-power overview of the entire section in the specific fluorescent channel (red). It becomes clear that there is no way to identify the brain region of interest (arrow and question mark) in this picture. This is the reason why it is common practice in neuroscience to counterstain sections with a stain (usually Nissl or DAPI) that allows unequivocal identification of distinct brain regions according to cytoarchitectonic criteria. Panel C of FIG. 12 shows a low-power overview on the same section, with the specific fluorescent signal (red) overlaid on the counterstain (blue). The counterstain allows scientists with basic knowledge in mouse brain anatomy to immediately identify key brain regions (indicated by arrows).

However, the identification of a region of interest requires expert knowledge in mouse brain anatomy and consulting a brain atlas. To identify the brain region of interest, Panel D of FIG. 12 displays the best matching picture from the Allen Mouse Brain Atlas (Allen Institute for Brain Science, Seattle, Wash.) (image 66 in the atlas; matching is based on those easy-to-identify brain regions indicated in panel C of FIG. 12). FIG. 12 shows a coronal section from a mouse brain stained with brightfield Nissl stain in panel B on the left (the most recent Allen Mouse Brain Reference Atlas does not comprise sections stained with fluorescent Nissl stain), and a corresponding drawing with several brain regions indicated (a brain atlas) in panel D on the right. It is left to the researcher to translate from the atlas to the experimental section.

In this example, one would conclude that the neurons in that portion of the cerebral cortex into which the adeno viral vector was injected project to the internal capsule and the internal globus pallidus. The latter is probably correct and interesting insofar as the internal globus pallidus is known to receive input from the caudate/putamen (part of the direct basal ganglia pathway) and the subthalamic nucleus (part of the indirect basal ganglia pathway) but not directly from the cerebral cortex. In contrast, the former is probably wrong because there are no neurons in the internal capsule to which neurons in the cerebral cortex could project. This real-world example demonstrates that using the currently practiced methodology would most probably not provide the correct identification of the brain region of interest. This is due to researchers needing to flip back and forth between plates of a mouse brain atlas to find a section in the atlas that is most similar to the section under study, infer the 3D boundaries of the region of interest, and translate that mental picture to the section under study (note that researchers use a brain atlas not just once, but for every identification on every brain section that they investigate).

In this regard, it is important to bear in mind that finding a section in a brain atlas that is most similar to the brain section under study may be further complicated by the fact that the cutting angle of brain sections almost always deviates from canonical planes such as the coronal plane. In the example shown in FIG. 12, this phenomenon caused the size ratio of the lateral ventricle and the cornu ammonis (CA) region to be different between the left and the right brain half, as clearly visible in panel C of FIG. 12. Most probably due to the same phenomenon, the specific fluorescent signal was found in a slightly different regional distribution in the contralateral brain half (arrowhead (without lead line and question mark) in each of panels B and C) than in the ipsilateral brain half (arrow and question mark in each of panels B and C). This issue is quite common, as it is almost impossible to avoid when cutting mouse brains into sections.

No tool or method exists that (i) objectively and accurately matches a section under study to the best fitting oblique angle slice (i.e., a virtual image plane within a 3D image volume) through a digital 3D volume reconstruction of high-resolution images of evenly spaced sections encompassing an entire reference mouse brain (henceforth referred to as "reference 3D histology image"), (ii) retrieves corresponding graphical brain region delineations and annotations from a digital 3D volume database of manual delineations of brain regions contained in the reference 3D histology images (henceforth referred to as "reference 3D brain region delineations"), and (iii) superimposes the corresponding graphical brain region delineations and annotations on the section under study (either on a computer screen or within the eyepieces of the microscope).

Even if this tool were available today, it could not efficiently be used in conjunction with the currently existing mouse brain atlases (namely, the Allen Mouse Brain Reference Atlas, the Paxinos and Franklin mouse brain atlas, and the Hof et al. mouse brain atlas). This is due to the fact that the distance between the sections in these atlases is too large (between 100 μm in the Allen Mouse Brain Reference Atlas and 130-150 μm in Hof et al.) for generating a sufficient reference 3D histology image and related reference 3D brain region delineations. Furthermore, none of these atlases comprises and/or was derived from sections stained with fluorescent Nissl stain (note that brightfield Nissl stain and fluorescent Nissl stain do not look identical, as can be seen in FIG. 12).

However, the failing of such a fundamental process as the identification of a brain region of interest because of insufficient tools (which may be surprising to many researchers) appears unacceptable for modern neuroscience research, particularly considering that the recently announced Brain Research through Advancing Innovative Neurotechnologies® (BRAIN) initiative places special emphasis on identifying specific anatomic and physiologic properties of cells within the brain.

A Solution to the Problem

The present inventors have developed techniques that registers histological microscopy images with 3D reference atlas images for the purposes of atlas-based registration. The approach offers the flexibility to work on thin 2D histological tissue sections, thick tissue slabs, and whole brain images acquired from cleared tissue preparations or reassembled serial section images, such as may be obtained from HIC software described above. Anatomical information mapping A(IM) software of the present disclosure is software that maps anatomical information from a tissue atlas to images of experimental tissue sections and volumes. Before describing example mapping techniques and features incorporated into the AIM software, anatomical atlases are first described in some detail.

Anatomical Atlases

Generally, an anatomical atlas provides structural information about an animal, organ, portion of an organ, or other tissue block. For example, a mouse brain atlas provides information about the cytoarchitecture of a mouse brain, including fiber tracts, ventricles, and nuclei. Unlike an atlas of the Earth—for which there is only one reference object—a mouse brain anatomical atlas is representative of all normal mouse brains of a particular species. As an example, a digital anatomical atlas is composed of the following components, with specific examples for a mouse brain atlas:

Image data that serves as the reference for determining the boundaries of structures. This might be serial sections of a mouse brain imaged with fluorescent Nissl stain and reassembled in 3D. There might be multiple channels of reference image data—all spatially aligned—that enable visualizing different types of structures or cells.

An ontology that provides information about what anatomical structures exist and how they are related to each other. This will provide a unique identifier for each anatomical structure as well as the hierarchical organization (the hippocampus is part of the cortical plate, which is part of the cerebral cortex, etc.).

Annotations that indicate the regions occupied by anatomical structures or other relevant anatomical information. The annotations use the unique identifiers defined by the ontology. One common approach is to create a label map that is spatially aligned with the image data that indicates what anatomical structure each voxel represents.

Following is an example of how an anatomical atlas can be built. Again, this example is in the context of a mouse brain, but the general principles can be applied to virtually any tissue block.

The image data for a digital anatomical mouse brain atlas can come from an individual animal—this was the approach used for the first several iterations of the Allen Mouse Brain Atlas. To create such an atlas, the animal is sacrificed, the brain is dissected and fixed, the brain is physically sectioned, the sections are mounted on slides, the sections are stained, the sections are imaged at high resolution by a microscope slide scanner, the section images are aligned to reconstruct the original 3D structure of the brain, and the resulting 3D image is annotated exhaustively.

The single-animal approach is common but introduces some challenges in using the resulting atlas. First, some variation is expected in the structure of different mouse brains—even of the same strain—so an atlas built from a single animal may not appear equally similar to all animals in a population. Second, it is difficult to complete all steps from start to finish without damaging the tissue in some way. Where tissue damage occurs, it becomes part of the reference atlas image data. In addition, due to the physical sectioning process, the resolution of the image data is lower along the sectioning axis than it is orthogonal to it.

Using multiple animals to create the reference image data addresses these problems. This approach repeats the process for imaging an individual brain over a group of animals. The collection of brains is then aligned and averaged to create a reference image that represents the population average. This average image is less different from all other brains in the collection than any individual brain. Damage that occurs to any individual brain will have a diminished influence on the average image. Because the sections from individual brains end up in slightly different positions, interpolation can increase the resolution along the sectioning axis in a manner similar to super-resolution imaging.

In one example, the present inventors used the following steps to create an average reference brain from 78 individual mouse brains sectioned coronally at 80 μm spacing and treated with fluorescent Nissl stain.

An individual brain image is selected as an initial "template."

Initialize image accumulator and mask accumulator buffers.

For each brain image in the collection:
  compute a mask that indicates the region of the image where there is brain tissue;
  rescale the pixel intensities so that the image has a target mean intensity value:

$$I' = I * \frac{\mu_t}{\mu_I},$$

wherein $\mu_I$ is the image's mean intensity and $\mu_t$ is the target mean;

register the individual brain image to the template using multiple stage registration up to a nonlinear (BSpline) transform (as described in Volume to Atlas Registration below);

if the normalized correlation image comparison metric recovered via registration is too large (e.g. >−0.16), disregard this brain from the average;

resample the individual brain image to align with the template and add to the image accumulator; and resample the individual brain mask and add to the mask accumulator.

Threshold the mask accumulator so pixels that do not receive a contribution from enough brains (e.g. <5%) are set to zero.

Initialize an average image to zero.

For each nonzero pixel in the mask accumulator, the average image pixel value is the corresponding value in the image accumulator divided by the mask accumulator.

This average brain becomes the new template—the process can be repeated.

The use of the mask enables creating an average image that properly weights the contributions from each brain at each voxel while eliminating damage from the boundary of individual brains. The masks could be edited manually to remove damage from the interior of individual brains. Furthermore, excluding brains for which the image comparison metric is not favorable helps keep the average image cleaner.

While the foregoing description provides an example of how an anatomical atlas can be created, it should be appreciated that the pertinent anatomical atlas can be created in another way and that AIM software made in accordance with aspects of the present disclosure can utilize any suitable anatomical atlas from any suitable source.

Section-to-Anatomical-Atlas Registration and Segmentation

In some aspects and as described below in detail, AIM software of the present disclosure can provide automated 2D and 3D (including output of the HIC software described above) image matching of experimental images (e.g., live microscopy images or previously captured microscopy images) to annotated references atlases. In some embodiments, the AIM software automatically generates and overlays 2D contours and/or 3D meshes onto the experimental image(s). The AIM software generates these contours and meshes based on the input anatomical atlas. In some embodiments, the AIM software labels regions within an experimental image with information retrieved from the input anatomical atlas. In some examples, this labeling of regions can be linked to the movement and/or positioning of a cursor on the screen displaying the experimental image and/or by touching, tapping, or other interaction with a touchscreen displaying the experimental image, among other things. In some examples, the labeling can be automatic based on level of granularity selected and/or degree of magnification, for example, in a manner similar to digital Earth maps that automatically vary the type and amount of labels depending on how far a user has zoomed into or out of the map. These and other features provide means for one or more users to interpret independent experimental results in a common, registered coordinate system. In some embodiments, image matching in the AIM software utilizes image intensities, differential weighting of regions based on strong image features and/or anatomical image constraints, and input from a user. The image matching and mapping can work on 2D histological section images, images of thick tissue slabs, and whole tissue block (e.g., whole brain) images acquired from cleared tissue preparations or reassembled serial section images.

In use, the AIM software can create a set of 2D anatomical region contours that align to the image content of the histological section image under study, superimposed on the 2D section image under study, either on a display monitor or within the eyepieces of the microscope. The AIM software can also create a set of 3D anatomical region contours that align to a cleared volume of a tissue block. To accomplish this, the AIM software may utilize a multistage, multiresolution image registration approach that incorporates information from image intensities, differential weighting of regions based on strong image features or anatomical constraints, and input from a user. The results of registration can then be used to automatically segment anatomical regions in the experimental image, perform quantitative analysis within targeted anatomical regions, transfer information from multiple individual experiments into a common atlas reference space, or augment an atlas with new reference image data.

A novel step in both 2D and 3D registration involves adjusting vertical (dorsal to ventral) and horizontal (lateral to medial) image scaling (typically in micrometers per pixel) for distortions due to histologic methods and species differences. In some embodiments, AIM software of the present disclosure can also scale rostral to caudal to deal with section shrinkage. The AIM software utilizes a ratio of vertical extent in a reference brain to vertical extent in an experimental section to correct for vertical image scale. A horizontal correction is similarly employed. The present inventors have discovered that this correction is essential for successful 2D and 3D linear and nonlinear registration of sections and brains to reference brains (and their atlases) for varying sources (laboratories, modalities, etc.).

One of the unique aspects of the present invention is the ability to register a microscope's coordinate system with a common anatomical atlas, which allows the AIM software to provide atlas information live at the microscope. This enables identifying the anatomical region at any location at any magnification, superimposing the boundaries of anatomical regions on live microscope images at any magnification, and automatic navigation to a region of interest (perhaps with appropriate selection of magnification for best viewing). This technology works with existing image data or live at the microscope. The technology also allows manual adjustment of automatically generated annotations for fine controls over anatomic specificity.

The AIM software uses section-to-atlas registration to establish correspondences between a 2D experimental tissue section and a 3D reference tissue-block image from an atlas. The AIM software can use this registration to automatically delineate the anatomical regions in an experimental section, for example, for stereologic cell counting or to identify which anatomical regions are present in a section.

Although the experimental section image can be considered a 2D image, in some embodiments the AIM software can handle the registration as a 3D-to-3D image registration in which the experimental section is the fixed image and the reference image is the moving image. This approach has several advantages, including: (a) avoiding rank-deficient transforms that would be required for 2D-to-3D registration; (b) accelerating registration because the points used to compute the image comparison metric are determined by region of the fixed image; and (c) enabling the expanding of the approach to handle thick sections or multiple serial sections reconstructed into 3D slabs.

As alluded to above, the present inventors have developed a multistage, multiresolution image registration approach for aligning an experimental section image to a whole tissue block reference image. One particular challenge of this problem is finding an initial set of transform parameters that roughly align the reference image with the section—the section can come from any position in the reference image, but it represents only a thin piece of the reference image. Embodiments of AIM software of the present disclosure address this issue by performing a coarse-to-fine search along the sectioning axis and keeping track of registration results of testing multiple hypotheses. The search strategy enables quickly finding the region of the tissue block the section comes from without exhaustively searching, preserving multiple hypotheses avoids committing too soon to a favorable set of transform parameters that may not be close to the globally optimal parameters.

As with volume-to-atlas registration (described below), this method relies on computing tissue masks for both the fixed experimental section image and the moving reference image to restrict where the image comparison metric is computed. Following is an example method that the AIM software may perform to register an experimental section image with reference tissue block image.

1. Perform a first registration stage that is a coarse-to-fine search along the sectioning axis.
    1.1. The sectioning axis is divided into equal segments (~16, in one example), and a set of initial candidate transforms is created to align the reference image with the section at each of these positions.
    1.2. Registration is run starting at each candidate location to adjust parameters of a centered Euler transform (3D translation and rotation about a point) at a coarse resolution (~128 pixels along the shortest axis, in one example). The optimization is restricted to enable translation only orthogonal to the sectioning axis and rotation only about the sectioning axis.
    1.3. The best one or more transforms (e.g., 3 in one example) of a set of candidate transforms are used to modify a new set of candidate transforms in which the spacing between candidates along the segmentation axis is halved. Registration is performed for each of the new candidate transforms.
    1.4. This process is repeated until the spacing between candidate transforms drops below a threshold (e.g., 80 μm).
2. Perform a second registration stage that refines favorable candidate positions along the sectioning axis.
    2.1. A new set of candidate transforms is initialized using the best candidate transforms (e.g., the best 5 transforms) from the previous stage.
    2.2. Registration is run starting at each candidate location to adjust parameters of, for example, a centered Euler transform at a coarse resolution (~128 pixels along the shortest axis, in one example). The optimization is restricted to enable rotation only about the sectioning axis.
3. Perform third registration stage that refines favorable candidate transforms allowing for oblique angles and scale differences.
    3.1. A new set of candidate transforms is initialized using the best 3 candidate transforms from the previous stage.
    3.2. Registration is run starting at each candidate location to adjust parameters of a scale-versor transform (translation, rotation, and non-uniform scaling) at a medium resolution (~256 pixels along the shortest axis, in one example).
4. Perform a fourth registration stage that refines the best candidate from the previous stage by adjusting parameters of a B-spline transform (nonlinear deformations of the 3D space) at a fine resolution (~512 pixels along the shortest dimension, in one example). This transform allows for small scale nonlinear deformations that account for small differences in structure between the reference brain and the experimental section. Using a small number of control points in the 3D B-spline parameterization (e.g., 8 control points along each dimension) avoids overfitting the image data which can lead to deformations that are not biologically relevant.

Anatomical Region Delineation and Modification

The AIM software can use the results of section-to-atlas registration to delineate anatomical regions on an experimental section. The transform recovered during registration is used to resample the atlas' anatomical label map over the space of the section image. This provides a label map that is spatially aligned with the section image. There are many ways that the AIM software can use this anatomical region information, such as the following ways, for example.

Click to identify and delineate a region. A user may click on, tap on, or otherwise select a location of interest in the displayed experimental section image. The corresponding location in the section's label map provides an unique ID of the anatomical region in which the clicked point resides. Information about the anatomical region at the clicked location is retrieved from the atlas' ontology, including, for example, the name of the structure, its position in the hierarchy, and a color code used for visualization. In some embodiments, the AIM software creates a mask for all pixels with the same region ID in the section's label map and colors and layers the mask over the section image, for example, using alpha blending. The AIM software may determine a contour representing the boundary of the region by walking the edge of the region mask and simplifying the contour using, for example, the Douglas-Peucker algorithm. The AIM software may render the contour over the section image, for example, using the region's visualization color. The region is selected in a hierarchal view of all regions in the atlas' ontology.

Delineate by name. A user searches for a region in the atlas' ontology and selects it. The AIM software may retrieve information about the anatomical region from the atlas' ontology, including the unique ID of the region, its position in the hierarchy, and a color code used for visualization. The AIM software may then create a mask for all pixels within the same region ID in the section's label map. The AIM software may color and layer this mask over the experimental section image using alpha blending. The AIM software may determine a contour representing the boundary of the region by walking the edge of the region mask and simplifying the contour using, for example, the Douglas-Peucker algorithm. The AIM software may draw the contour over the section image using, for example, the region's visualization color. Note that if the region does not exist in the current section, the section's label map will contain no pixels with the selected region ID.

Identify all regions in a section. The AIM software may enumerate the unique region IDs in the section's label map based on looking-up each region in the atlas' ontology. The AIM software may also display a list of all region names and/or expand the ontology hierarchy to the level of each indicated region. The level of expansion could be limited, for example, by including a "rank" value in the ontology. In this example, for regions that are below a threshold rank, the AIM software may traverse up the ontology hierarchy until reaching a region that is of sufficient rank.

Anatomical region delineations may not perfectly match the underlying experimental section image due to damage to the section tissue, failure of the registration algorithm, or minor differences in anatomy. In this case it is desirable that the AIM software provides intuitive tools that enable a user to modify the boundaries of the anatomical regions. In some embodiments, the AIM software can handle this via a method that uses the way one anatomical boundary is adjusted to influence the boundaries of nearby anatomical regions as well.

The points on the contour of an anatomical region provide a set of corresponding landmarks between the experimental brain and the atlas. The transform the AIM software recovers during section-to-atlas registration provides an initial mapping between points on the section and points in the atlas. The AIM software may visualize landmark points to the user in the coordinate space of the experimental section and provide the user the ability to change the location of a landmark on the experimental section. The AIM software may then use a collection of unchanged and modified landmark positions to build a B-spline (nonlinear) transform that modifies the transform established by registration. In particular, the result from registration up to an affine transform is used to establish a set of corresponding landmark positions in the section and atlas. The positions of the landmarks in the atlas are updated by the nonlinear B-spline recovered by registration while the positions of the landmarks in the section incorporate modifications by the user. A new B-spline transform is computed to map the modified section landmarks onto the atlas landmarks and composed with the affine transform result from registration. The resulting transform incorporates the adjustments the user has made to the boundary of the anatomical region.

To find a B-spline transform that covers the full extent of the section, however, it may be necessary to use control points from other anatomical regions or evenly distributed across the section. But, adjusting the points on the boundary of one anatomical region should have an impact on control points in other anatomical regions. In some embodiments, the AIM software modifies the positions of other control points relative to the displacement of a modified control point using Gaussian decay. Given a landmark that moves from p to p' and a parameter a that controls the radius of influence of the modification, the displacement of another landmark q is:

$$q' = q + (p' - p)e^{-\frac{(|q-p|)^2}{2\sigma^2}}.$$

Figure 13:
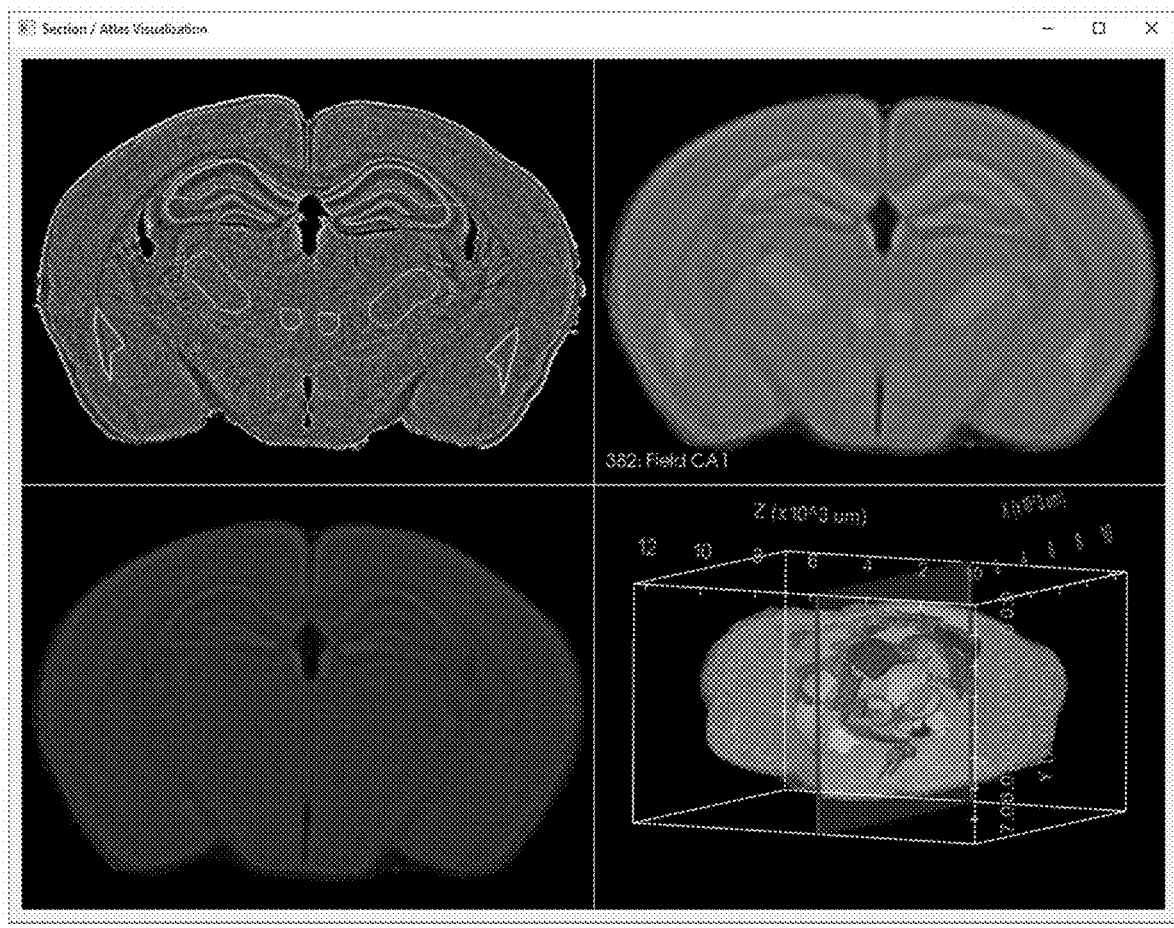
FIG. 13 is a screenshot of a section/atlas visualization UI provided by example anatomical information mapping (AIM) software of the present disclosure, illustrating information mapped from a tissue block atlas to an experimental section.

FIG. 13 is a screenshot of a section/atlas visualization UI that the AIM software of the present disclosure may be configured to provide. In the example illustrated, the experimental section at issue is a single 2D section of a mouse brain under examination, and the tissue block atlas is derived from the Allen Mouse Brain Atlas noted above. The experimental section appears in the image in the upper-left panel of FIG. 13, and a 3D brain atlas image appears in the lower-right panel of FIG. 13. During the registration process, the AIM software registers the experimental section image (upper-left panel) to an extracted 2D atlas section image (upper-right panel) extracted from the 3D brain atlas image (lower-right panel). Although not illustrated, in this embodiment, hovering a screen cursor (not shown) over a region in either of the upper two 2D images (i.e., the experimental section image (upper-left panel) and the extracted 2D atlas section image (upper-right panel)) causes the AIM software to display the name of that region in the UI proximate to the hover location. Selecting a region, for example by clicking a computer mouse at the hover location, from either of the upper two images may cause the AIM software, for example, to 1) display a 3D surface representation of that region in the 3D brain atlas image in the lower-right panel of the UI of FIG. 13, 2) display a semi-transparent overlay of that region in the corresponding 2D atlas section image in the upper-right of the UI, and 3) display a boundary of the region in the 2D experimental section image in the upper-left of the UI. As can be seen in the lower-right panel of the UI, in this example the AIM software shows the location of the extracted 2D atlas section image (upper-right panel) within the 3D brain atlas image. The lower-left panel of the UI of FIG. 13 shows the experimental section image (upper-left panel) and the extracted 2D atlas section image (upper-right panel) overlaid with one another.

Figure 14:
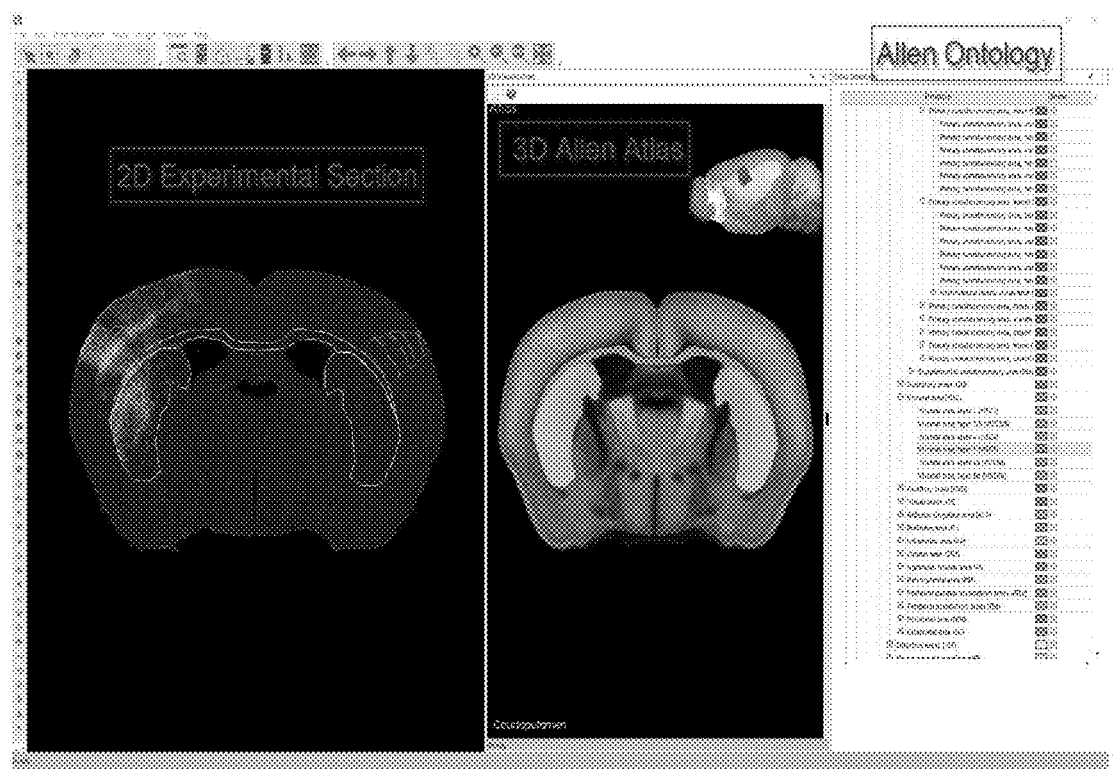
FIG. 14 is a screenshot of a histological section image and 3D atlas UIs for, respectively, displaying and/or interacting with at least one histological section image (e.g., a live-view image or stored image) and displaying and/or interacting with one or more images and/or ontological hierarchical information of a tissue block atlas.

FIG. 14 illustrates other UIs that AIM software of the present disclosure may provide. An example experimental section image UI is shown on the left side of FIG. 14, and an example 3D atlas UI is shown on the right-hand side of FIG. 14. In this example, the annotations derived from the 3D atlas that the AIM software displays on the 2D experimental section image in the left-hand side window include overlays on somatosensory cortical areas, the corpus callosum, caudoputamen, with corresponding anatomic regions shading in the matching section from the 3D annotated mouse brain atlas in the right-hand window, and checked in the ontology controller located on the right side of the right-hand window. In this embodiment, both windows are movable and resizable at the discretion of the user.

Figure 15A:
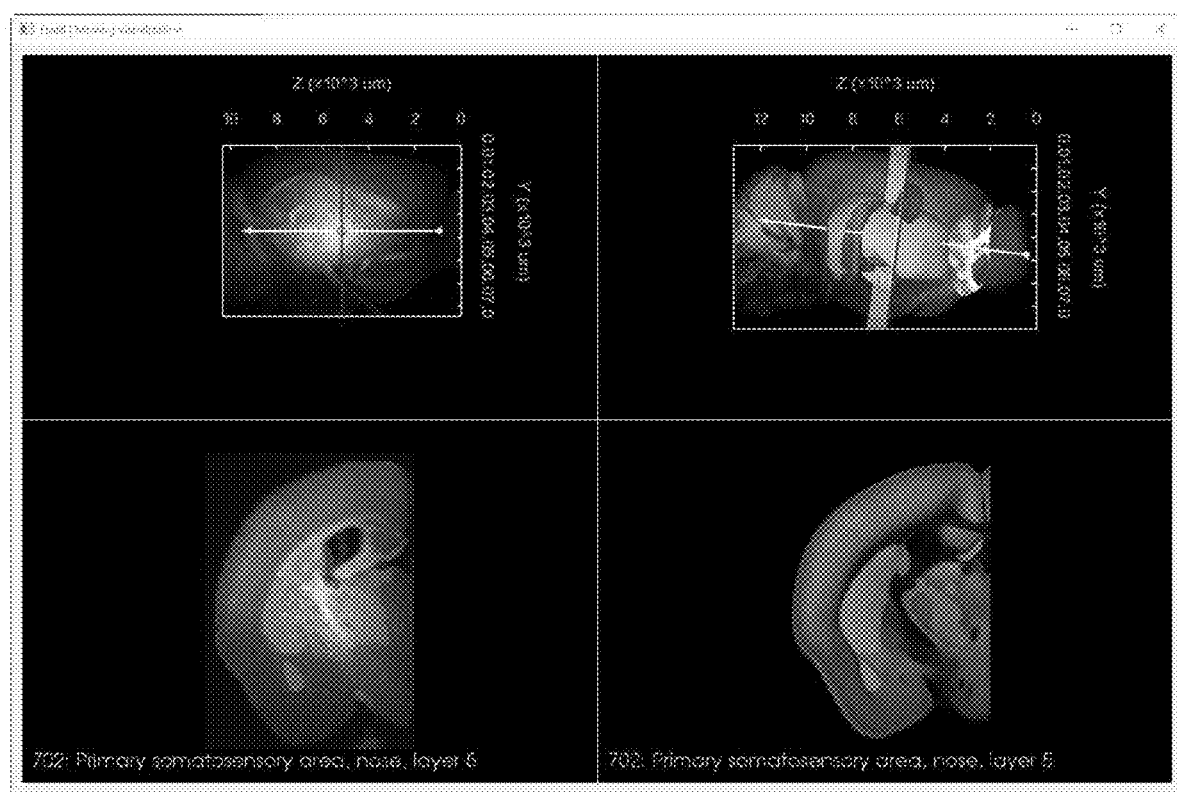
FIG. 15A is a screenshot of a fixed/moving visualization UI provided by example AIM software of the present disclosure, illustrating information mapped from a tissue block atlas to a histological section image.

FIG. 15A is a screenshot of a fixed/moving visualization UI that AIM software of the present disclosure may display to a user during use of the software. The upper left panel of fixed/moving visualization UI of FIG. 15A displays a 3D tissue block image (for example, made using the HIC software described above) of the experimental tissue block under consideration (here a mouse brain), the upper right panel of the UI displays the 3D atlas image (here, a 3D Allen Brain Institute annotated mouse brain), the lower right panel of the UI displays a 2D atlas section image that the AIM software has registered with the experimental section image, and the lower left panel shows an enlarged image of an atlas information layer overlaid with the experimental section image also displayed in the upper left panel. In this example, the lower left panel shows that the atlas information layer includes overlays on somatosensory cortical areas, the corpus callosum, caudoputamen, basolateral amygdalar nucleus, dentate gyrus, and thalamic nuclei. The corresponding anatomic regions are shaded in the two right panels containing the atlas images.

Figure 15B:
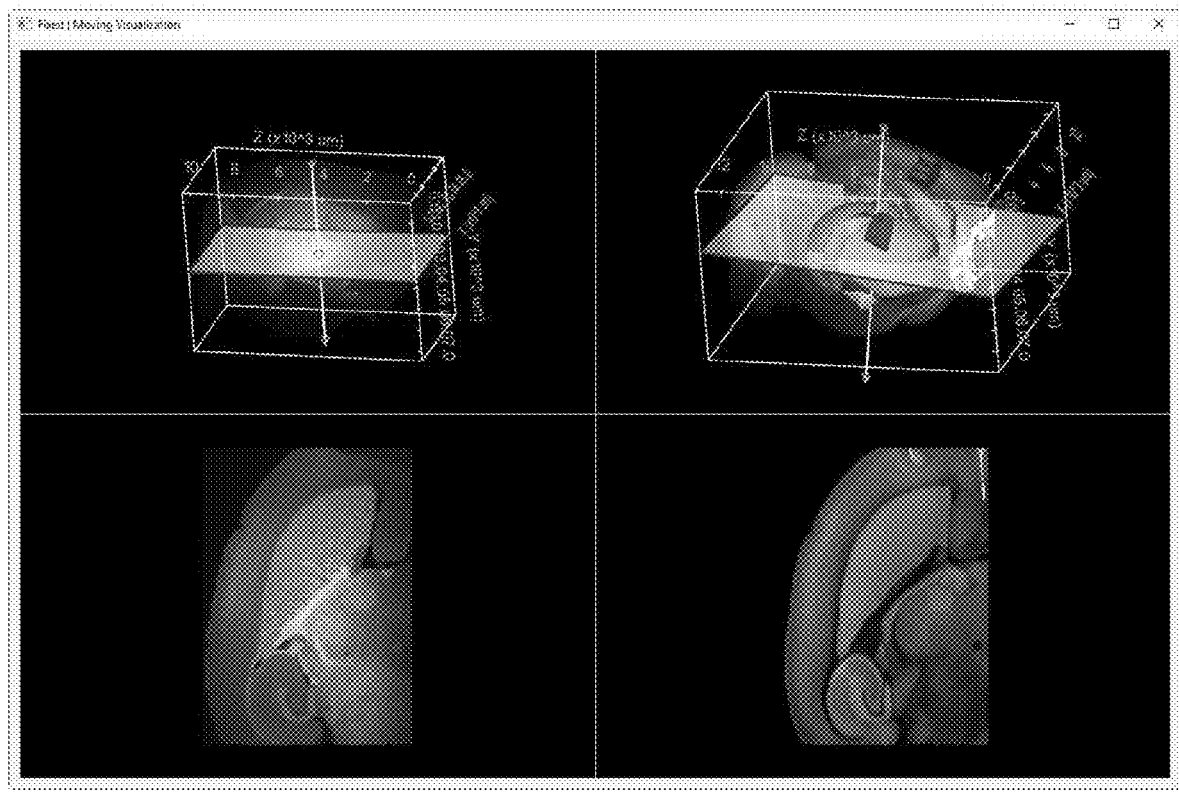
FIG. 15B is another screenshot of the fixed/moving visualization UI of FIG. 15A, illustrating other information mapped from a tissue block atlas to a histological section image.

FIG. 15B illustrates the fixed/moving visualization UI of FIG. 15A after a single manipulation of the view in FIG. 15A to switch to another canonical orientation (here, transverse). In one example, switching between the orthogonal coronal, sagittal, and transverse (horizontal) views is accomplished by pressing the X, Y, or Z keys on a keyboard input device. Other manners of input may be used, such as clicking on X, Y, or Z soft buttons onscreen and/or using a trackball or other type of input device. After manipulation, the AIM software immediately displays the selected anatomies that are now sliced along previously unavailable planes. As one example, for serially section align by the HIC software from whole slide images, once the HIC software has aligned the section images and compiled them into a 3D volume, a viewer (using a 3D viewing technology) can arbitrarily view the volume from any cut or projection angle. Prior to compilation and alignment, viewing is limited to the planar view corresponding to the cut orientation.

FIGS. 16 to 27 illustrate features of an actual implementation of AIM software made in accordance with the present disclosure, as well as steps that a user can perform in connection with using those features.

Figure 16:
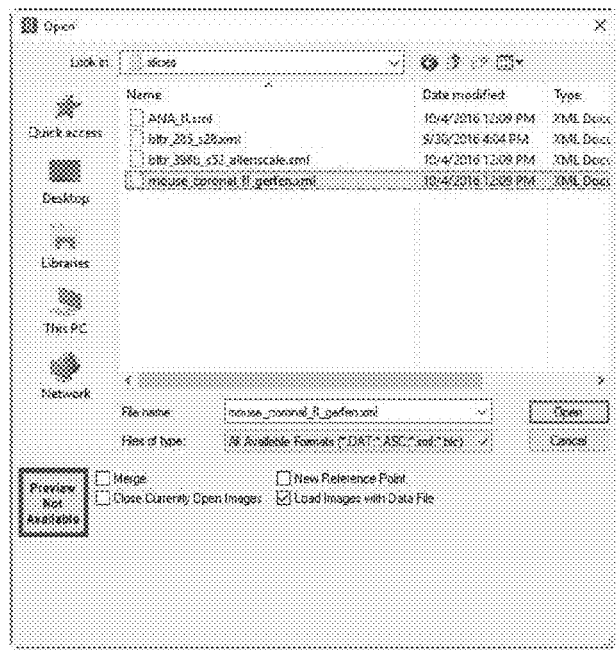
FIG. 16 is a screenshot of a file-selection dialog UI provided by example AIM software that allows a user to select a histological section image file for a work session.

FIG. 16 illustrates a file-selection dialog window of the example AIM software that allows the user to select the data file containing data for the experimental mouse brain under consideration. In this example, the desired data file is shown highlighted in the file-selection window.

Figure 17:
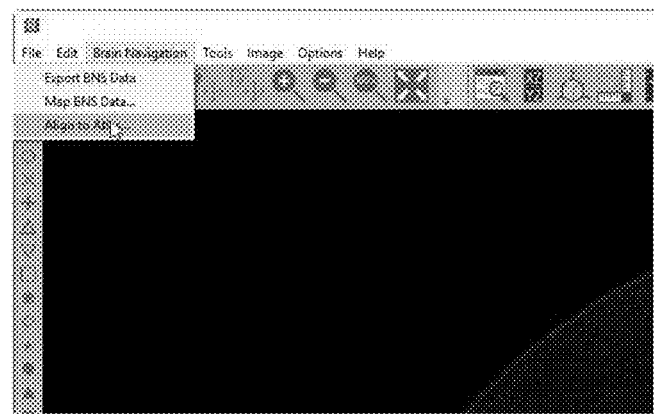
FIG. 17 is a partial screenshot of a UI provided by example AIM software, illustrating a dropdown menu of options a user can select (in the figure "BNS" stands for "brain navigation system")

FIG. 17 shows a UI that the AIM software opens in response to the user selecting the "Open" button in the file-selection dialog window of FIG. 16. As seen in this example, the UI of FIG. 17 includes a region that displays an image contained in the selected data file. FIG. 17 also illustrates the user-selection of the "Align to Atlas . . . " option under the "Brain Navigation" tab of the UI.

In response to the user selecting the "Align to Atlas . . . " option, the AIM software opens an atlas-selection dialog UI with which the user can select the file containing the desired atlas. This atlas-selection dialog UI is shown in FIG. 18, in which the desired atlas file is shown highlighted.

Figure 18:
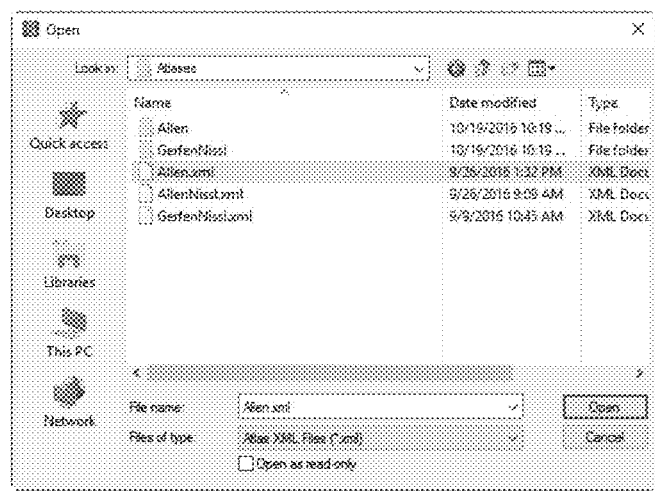
FIG. 18 is a screenshot of an atlas-selection dialog UI provided by example AIM software that allows a user to select an atlas file for a work session.
Figure 19:
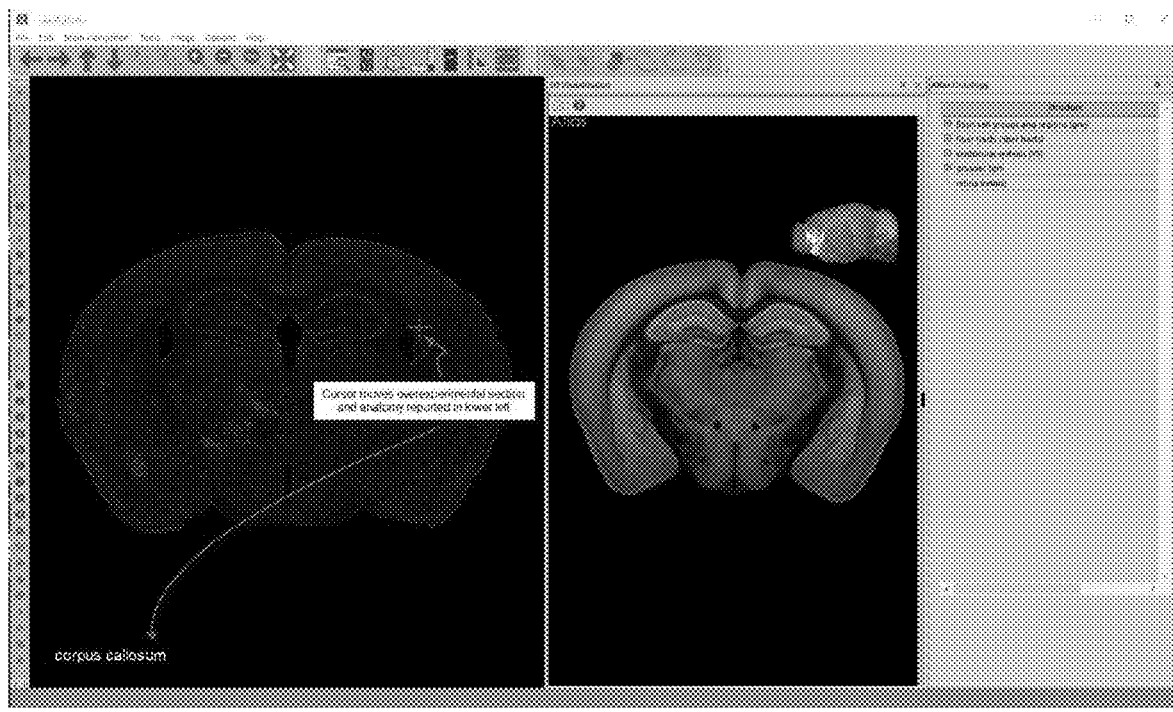
FIG. 19 is an annotated screenshot of the histological section image and 3D atlas UIs of FIG. 14, illustrating the effect of hovering a cursor over a region of interest in the histological section image.

In response to the user selecting the "Open" button in the atlas-selection dialog UI of FIG. 18, the AIM software performs the image registration (see descriptions above) that aligns the experimental section image (displayed in the experimental section image UI on left-hand side of FIG. 19) from the experimental brain data file and then displays an image of the matched section of the atlas brain in the 3D atlas UI (right-hand side of FIG. 19), along with a reduced-sized image of the entire atlas brain. Also seen in FIG. 19 on the right-hand side of the 3D atlas UI is an atlas ontology window that shows an ontological hierarchy contained in the atlas. In FIG. 19, the ontological hierarchy is shown in a collapsed state, with only the highest-level headings being displayed. FIG. 19 also shows, in the experimental section image UI on the left, that the user has moved the cursor to a particular region of the experimental section image, and is hovering a cursor over that region, and that, in response, the AIM software is displaying the anatomical name of that region in the lower left-hand portion of the experimental section image UI.

Figure 20:
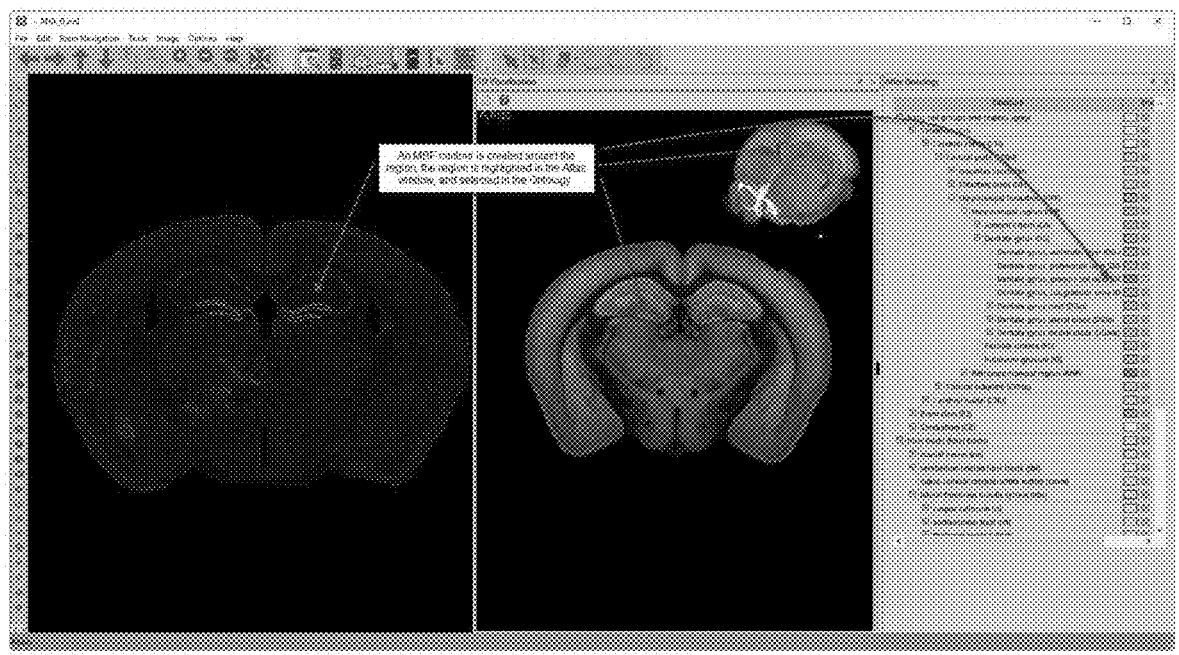
FIG. 20 is an annotated screenshot of the histological section image and atlas UIs of FIG. 14, illustrating the effect of performing a Ctrl+left-click operation with a cursor located at a region of interest in the histological section image.

FIG. 20 illustrates a result that the AIM software provides when the user performs a Ctrl+left-click operation with a computer mouse when the cursor is located at a region of interest in the experimental section image. In this example, when the user performs the Crtl+left-click operation, the AIM software: 1) displays a contour line around the corresponding anatomical region in the experimental section in the section user-interface display window; 2) highlights that anatomical region in the atlas images in the atlas user-interface display window; and 3) expands the hierarchy (as needed) to reveal the selected anatomy in the hierarchy and places a checkmark next to the selected anatomy identifier. This helps the user get orientated quickly and eliminates the need for the user to search through over one thousand structures in this example. In this embodiment, when the user performs a second Ctrl+left-click operation, the AIM software deselects the currently selected region and unchecks the corresponding anatomy identifier.

Figure 21:
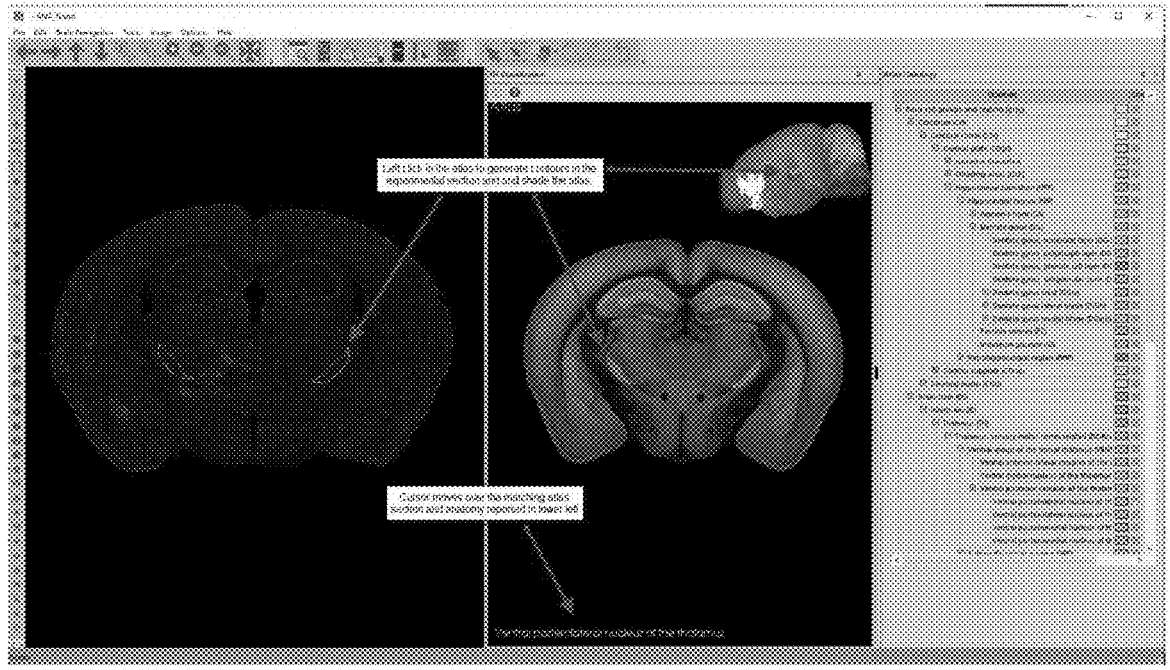
FIG. 21 is an annotated screenshot of the histological section image and atlas UIs of FIG. 14, illustrating the effect of performing a left-click operation with a cursor located at a region of interest in the histological section image.

FIG. 21 illustrates a result that the AIM software provides when the user performs a left-click operation with a computer mouse when the cursor is located at a region of interest in one of the atlas images in the 3D atlas UI. In this example, when the user performs the left-click operation, the AIM software: 1) displays a contour line around the corresponding anatomical region in the experimental section in the section user-interface display window; 2) shades that anatomical region in the atlas images in the atlas user-interface display window; and 3) expands the hierarchy (as needed) to reveal the selected anatomy in the hierarchy and places a checkmark next to the selected anatomy identifier. Hovering over a region within one of the atlas images causes the AIM software to display the anatomical name of that region in the lower left-hand portion of the 3D atlas UI.

Figure 22:
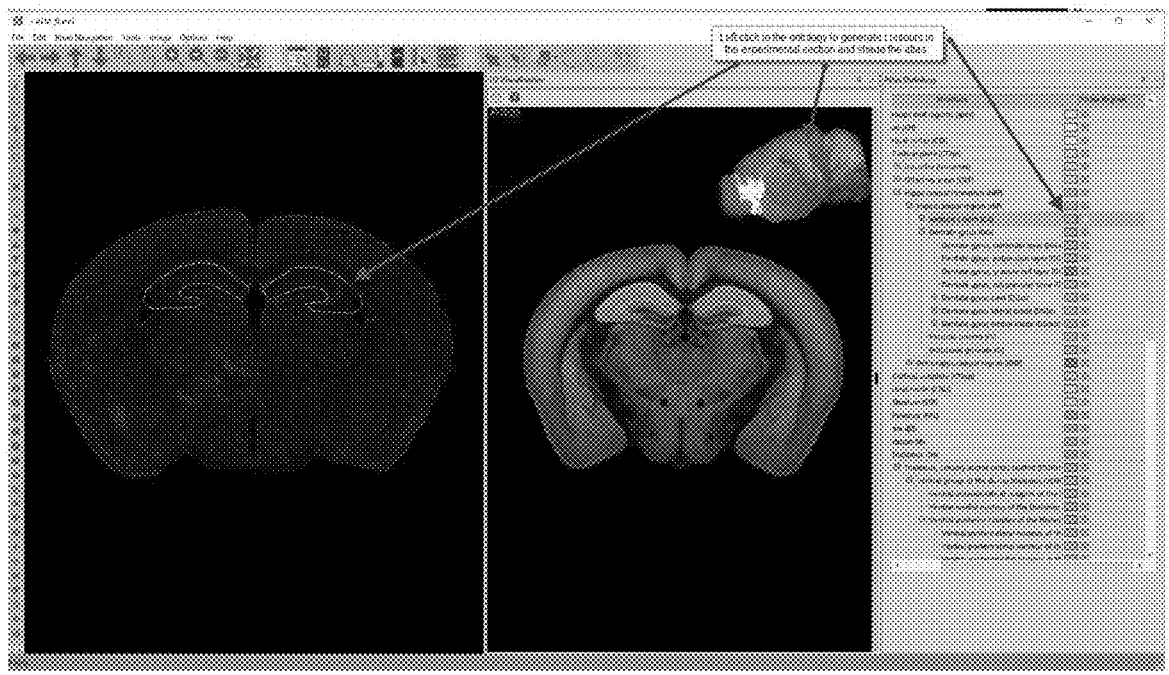
FIG. 22 is an annotated screenshot of the histological section image and atlas UIs of FIG. 14, illustrating the effect of a user selecting a checkbox in the "Display Region" column of the ontological hierarchy.

FIG. 22 illustrates a result that the AIM software provides when the user checks an anatomical descriptor in the "Show Region" in the ontological hierarchy displayed in the 3D atlas UI. In this example, when the user checks any one or more of the checkboxes in the "Show Region" column, the AIM software: 1) displays a contour line around each corresponding anatomical region in the experimental section in the section user-interface display window and 2) shades each anatomical region in the atlas images in the 3D atlas UI.

Figure 23:
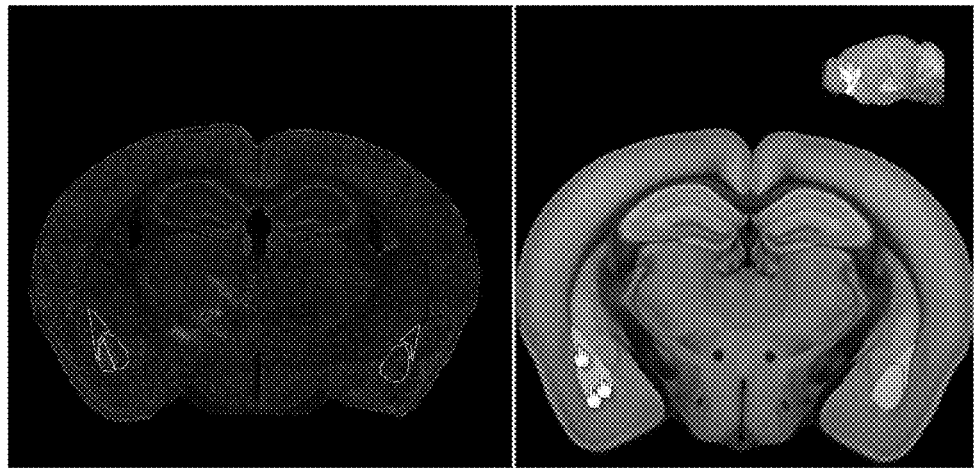
FIG. 23 is a screenshot of portions of the histological section image and atlas UIs of FIG. 14, illustrating the effect of performing a Ctrl+left-click operation with a cursor located at a region of interest in the atlas section image.

FIG. 23 illustrates a feature of the example AIM software that allows the user to perform contour adjustment and cell detection. In this example, the starting point is having no anatomies selected, and the user performs Ctrl+left-click operations in the 3D atlas section image in the right-hand panel of FIG. 23 for the anterior and posterior basolateral amygdalar nuclei and the lateral amygdalar nucleus (at the finger pointers in FIG. 23). The AIM software displays corresponding contour lines in the experimental section image that should enclose the nuclear expressing vector in that region in the screen-left hemisphere.

Figure 24:
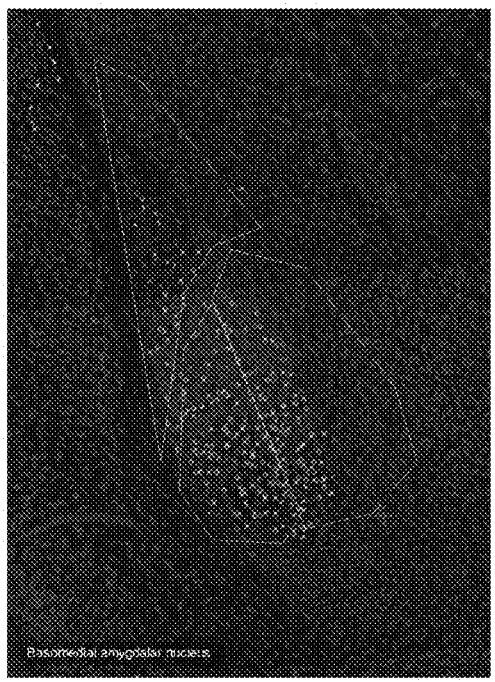
FIG. 24 is screenshot of the zoomed-in left-hand contours of the histological section image of FIG. 23.
Figure 25:
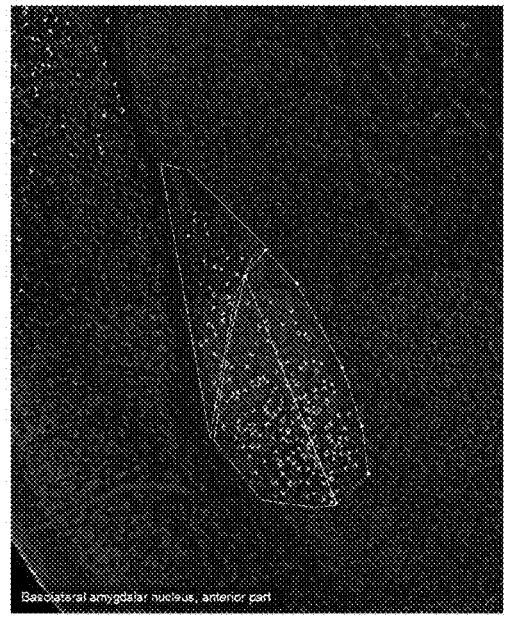
FIG. 25 is a screenshot of the zoomed-in contours of FIG. 24 after adjustment by a user.

The user may then perform a zoom operation (e.g., a Marquee zoom) into the contoured region of the experimental section image in FIG. 23. The results of such a zoom are shown in FIG. 24. The user may then use a "Select Objects" tool (not shown, but can be, e.g., any cursor-based selection tool) to edit any one or more of the three contours so that they enclose the object expressing the nuclear-expression vector (lighter dots). FIG. 25 illustrates the adjusted contours.

Figure 26:
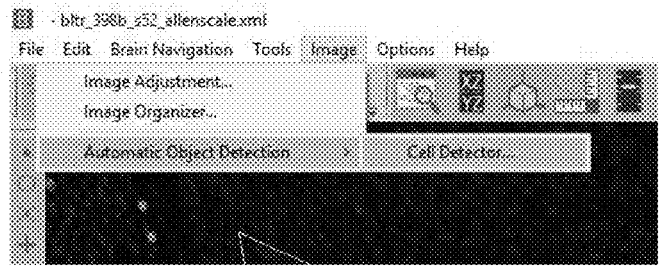
FIG. 26 is a screenshot of a portion of the histological section image UI of FIG. 14, illustrating a user-selection of a "Cell Detector . . . " option.

Once the user has achieved the desired contour adjustment(s), they may then begin to initiate the automated cell detection feature of the AIM software, here, by selecting the "Cell Detector . . . " sub-option under the "Automatic Object Detection" option under the "Image" tab of the section UI. FIG. 26 displays the "Cell Detector . . . " option.

Figure 27:
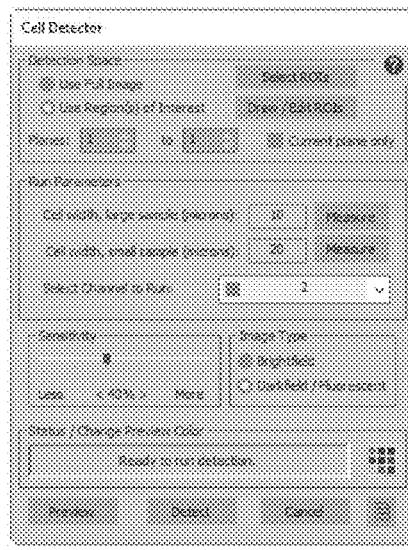
FIG. 27 is a screenshot of an example "Cell Detector" dialog window UI that the AIM software displays in response to the user-selection of the "Cell Detector . . . " option of FIG. 26.

In response to the user selecting the "Cell Detector . . . " option, the AIM software opens a "Cell Detector" dialog window with which the user can select various options available to control the automated cell-detection functionality of the AIM software. This "Cell Detector" dialog window is shown in FIG. 27. The AIM software may perform the automated cell detection in any suitable manner.

Live-View Image and Imaging-Device Control

As noted above, the experimental section image at issue can be a live-view image from an imaging-device, such as a microscope that may include one or more automatedly controllable aspects, for example, multiple automatedly-switchable objective lenses of differing magnifying powers, an automated focusing system, and/or an automated stage. In some embodiments, the AIM software may be configured to control one or more functions of the imaging-device based on a user's interaction with a live-view image from the imaging device, a displayed atlas image, and/or a graphically displayed ontological hierarchy.

For example and referring to FIG. 21 in which the image on the left-hand side of the figure is a live-view image from an imaging device, if a user left-mouse-clicks on a region of interest within the live-view image, the atlas section image, or checks a box in the displayed ontological hierarchy in the atlas UI on the right, the AIM software may, for example, execute one or more image-annotation algorithms to 1) display a contour line around the corresponding anatomical region in the experimental section in the section user-interface display window, 2) shade that anatomical region in the atlas images in the atlas user-interface display window, as noted above, and/or 3) display one or more ontological labels in association with the live-view image or the atlas section image, or both. In addition, the AIM software may also or alternatively allow a user to select (e.g., via a right-mouse click popup menu) options that cause the AIM software to execute algorithms to subsequently acquire images and/or to perform measurements (e.g., cell counting) exactly within the anatomy of interest at a high resolution (e.g., with an oil lens).

As another example, if the user then double-left-mouse-clicks inside a contoured region in the experimental section or in a shaded anatomical region in the atlas section image, the AIM software may execute one or more live-view imaging-device control algorithms to automatically move the stage, increase the magnification, and/or automatically focus the imaging system to effectively zoom into the contoured region. Those skilled in the art will readily understand that many variations of selection and zooming in and zooming out can be devised that are under the control of the AIM software in response to user inputs directed to any one of the displayed images and/or the graphically displayed ontological hierarchy. Automated annotation of anatomies on a live-view image of a specimen slide that is at a low resolution provided by AIM software of the present disclosure, and the AIM software's ability to keep track of location on a slide while switching objective lenses (e.g., to a higher magnification lens) enables precise measurements within objectively determined regions of the slide-mounted tissue section at issue. This is an extremely powerful feature that can greatly improve the efficiency of a researcher or other user. The required expertise of being able to navigate a static, canonically atlas while at the microscope in order to conduct neuroscience research is no longer required given the automation developed under the AIM software.

In one example, the live-view-imaging-device control algorithms include algorithms for creating a unified, registered coordinate system as between the imaging device, the live-view image, and the atlas image(s). This unified coordinate system allows investigators to maintain anatomic reference across imaging devices and spatial resolutions, and results in the ability to compare measurements from such imaging experiments across cohorts, experiments, and laboratories. For example, experimental sections under imaging registered to the unified coordinate system can now be compared to sections from an animal from a different treatment group without the need to manually delineate relevant anatomies in the sections. Any measurements made in relevant anatomies are directly comparable. Further, this unified coordinate system allows the live-view-imaging-device control algorithms to control the imaging device seamlessly, such that the researcher can select of any regions of interest in the experimental sections under imaging for additional investigation, validation, or review, regardless of whether the user makes the selections via an atlas image, ontology, or live-view image.

Volume-to-Atlas Registration

In some embodiments, the AIM software can use volume-to-atlas image registration to establish correspondences between two whole tissue block images. This can be used for building average reference image data when constructing an atlas (as described above) or to map information from an experiment into the coordinate space of an atlas. The AIM software handles this registration as a 3D-to-3D image registration problem. Whether the reference image data or experimental image data is treated as the fixed image depends on the desired result of the registration. If the reference tissue block image is the fixed image, the transform recovered by registration can be used to resample the experimental image data into the reference image space to build an average image or to perform image comparisons from multiple experiments in a common coordinate framework. When the experimental tissue block image is the fixed image, the transform recovered by registration can be used to resample annotation information from the atlas that provides the reference image. In essence, the AIM software does not alter the original data but can map annotations from an atlas back to the experimental space.

The selection of an image comparison metric depends on the modality of the reference and experimental images. If the images have the same modality, a normalized correlation image metric is appropriate, as it accounts for scalar differences in image intensities that can occur when brains exhibit different stain penetrations or are imaged with different exposure times. If the images have different modalities (e.g. a different stain or microscopy method is used for imaging), a multimodal image comparison metric is desirable, such as the Mattes mutual information metric. Such metrics attempt to find a nonlinear mapping between the intensity distributions observed in the two images.

In some embodiments, the AIM software uses a multi-stage, multiresolution image registration method for aligning 3D whole brain images. The method starts at a coarse resolution to quickly obtain a rough alignment of the images and refines the alignment at finer resolution levels. Because the whole brain images have a lower resolution along the sectioning axis, smoothing and down-sampling often occurs only along the sectioning plane. The method relies on computing a mask that indicates the region of each image that represents tissue (as opposed to the non-tissue background). This tissue mask is used to restrict the region in which the AIM software computes the image comparison metric. Without it, registration tends to find transform parameters that align the boundary of the brain without matching the interior content. This is because the difference in intensity between tissue and non-tissue regions is significant, so the image comparison metric is heavily detrimentally impacted when these regions overlap. Using masks removes the contribution from non-tissue regions. Following is an example method that the AIM software performs to register an experimental tissue block image with reference tissue block image:

1. Compute a tissue mask for both the fixed and moving images using gradient-based segmentation (described above relative to the HIC software) and dilate both masks (e.g., by ~160 μm)
2. Initialize a translation transform that aligns the centers of the two tissue blocks.
3. Perform a first registration stage that adjusts parameters of a translation transform (3D translation) at a coarse resolution (e.g., ~64 pixels along the shortest dimension) without using tissue masks in the metric computation. This roughly positions the moving brain in the same spot as the fixed brain.

4. Perform a second registration stage that adjusts parameters of a centered Euler transform (3D translation and rotation about center point) at a coarse resolution (~128 pixels along the shortest dimension, in one example) using the fixed tissue mask to restrict where the image comparison metric is computed. This roughly orients the moving brain to align with the fixed brain.

5. Perform a third registration stage that adjusts parameters of a scale-versor transform (translation, rotation, and non-uniform scaling along any axis) at a coarse-to-medium resolution (e.g., ~128 and 256 pixels along the shortest dimension at each level) using fixed and moving tissue masks to restrict where the image comparison metric is computed. This adjusts for scale differences between the two brains.

6. Perform a fourth registration stage that adjust parameters of an affine transform (translation, rotation, non-uniform scaling, shearing, and skew) at a medium resolution (~256 pixels along the shortest dimension, for example) using fixed and moving tissue masks. This optional step allows for shearing differences which may be able to correct for errors accumulated during 3D serial section reconstruction.

7. Perform a fifth registration stage that adjusts parameters of a B-spline transform (nonlinear deformations of the 3D space) at a fine resolution (e.g., ~512 pixels along the shortest dimension) using fixed and moving tissue masks. This transform allows for small scale nonlinear deformations that account for small differences in structure between the two brains. Using a small number of control points in the 3D B-spline parameterization (e.g., 6 control points along each dimension) avoids overfitting the image data which can lead to deformations that are not biologically relevant.

Connecting Multiple Atlas Spaces

In some embodiments, AIM software of the present disclosure can use volume registration in various ways for atlas building tasks in addition to creating an average image as described above. Volume registration with a multiple modality image comparison metric can be used to add reference images of different imaging modalities to a single atlas—this enables establishing a common anatomical annotation for brains imaged in different manners or enables creating. Moreover, this could improve the quality of the anatomical annotation because some structures may be better visualized in different modalities.

In some embodiments, AIM software of the present disclosure can use volume registration to merge information from multiple atlases. The transform the AIM software recovers from registering the reference image from two atlases can be used to move anatomical annotation information from one atlas space to the other.

In some embodiments, AIM software of the present disclosure can use volume registration to transfer information from an established atlas to create a novel atlas. In this case, the AIM software uses the reference image for the novel atlas as the fixed image during registration with the reference image from the established atlas. The transform the AIM software recovers from volume registration is used to resample the delineations from the established atlas into the coordinate space of the novel atlas. Another alternative is to store the transform that maps from the coordinate space of one atlas into the coordinate space of another atlas. When an experimental image is registered to the novel atlas' reference image, the transforms can be composed to link to the coordinate space of the established atlas.

All of these methods depend on being able to use multiple modality image comparison metrics (e.g. the Mattes mutual information metric) during registration. Multiple modality image comparison metrics find a nonlinear relationship that explains how different image modalities represent the same tissue with different intensities (e.g. white matter tracts may appear bright relative to surrounding tissue with one modality, but relatively dark in another modality). When multiple modality image comparison metrics fail, landmark-based registration can be used as a substitute. The major difference compared to image-based registration is that the transforms are recovered by geometric relationships between points in the coordinate space of two brains instead of by optimization of an image comparison metric that operates over the domain of the fixed image.

The present inventors have developed the following procedure to perform landmark-based registration in a manner similar to multiple stage image registration. This approach has the advantage of minimizing error while avoiding overfitting of the nonlinear B-spline transform. An expert anatomist manually identifies landmark correspondences between a pair of fixed brain and moving brain images. Least squares fitting is used to recover an affine transform that best maps the fixed brain landmarks onto corresponding moving brain landmarks. The AIM software uses the inverse of this affine transform to transform the moving brain landmarks. The new set of landmarks correspondences (the original fixed landmarks and the transformed moving landmarks) are used to find a B-spline-based nonlinear transform. The transform that maps from the fixed brain to the moving brain is then the composition of the affine and B-spline transforms.

Example Deployment of HIC and AIM Software

Figure 28:
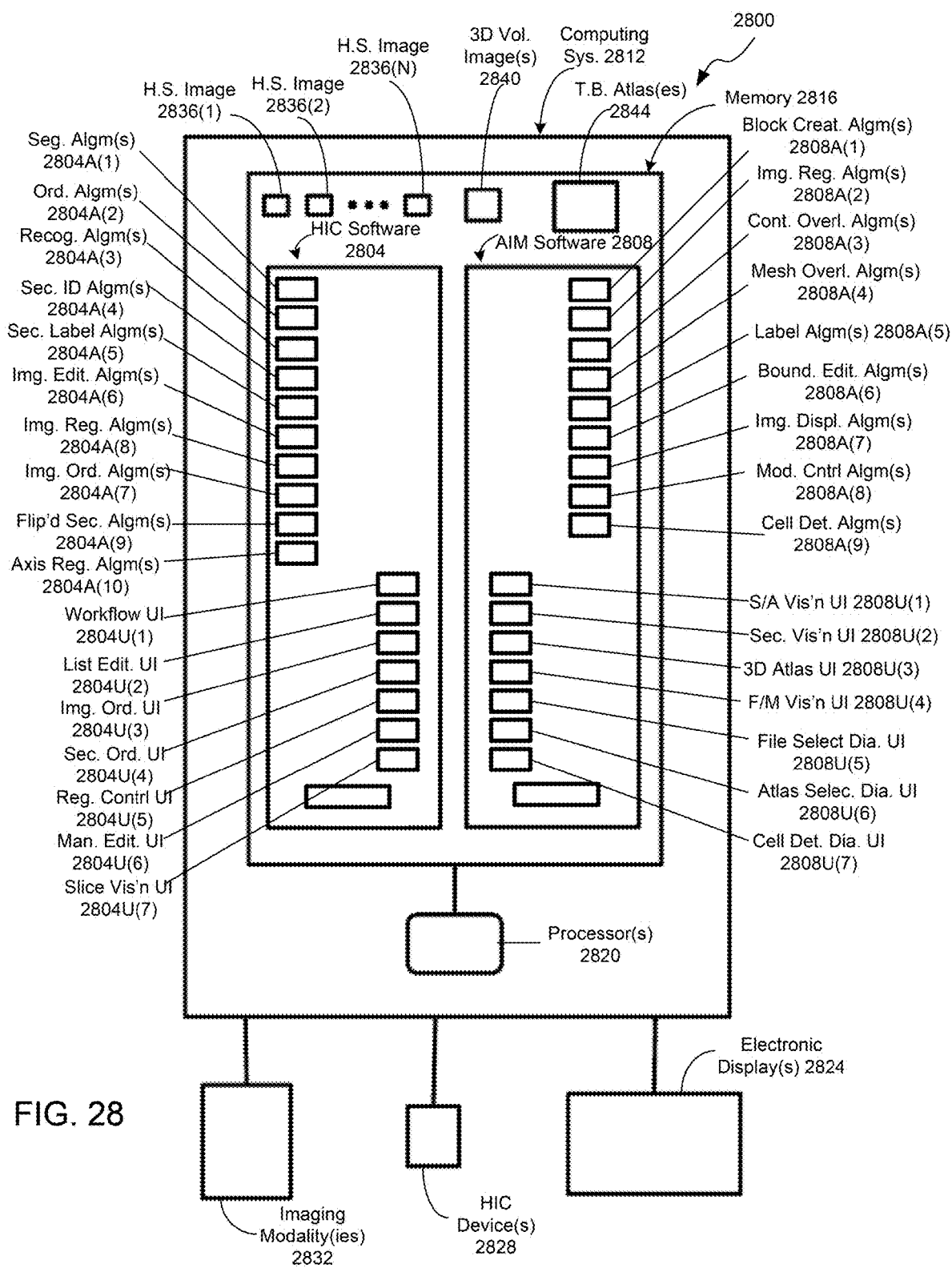
FIG. 28 is a high-level diagram of an example deployment of HIC and AIM software of the present disclosure.

FIG. 28 illustrates an example deployment 2800 of both HIC software 2804 and AIM software 2808 made in accordance of aspects of the present invention. In deployment 2800, HIC software 2804 may include any or all of the functionalities described above in the section titled "3D HISTOLOGICAL IMAGE CONSTRUCTION SOFTWARE" and AIM software 2808 may include any or all of the functionalities described above in the section titled "ANATOMICAL INFORMATION MAPPING SOFTWARE". It is emphasized that deployment 2800 is merely illustrative and that many other deployments, such as deployments containing only one or the other of HIC and AIM software 2804 and 2808 and deployments deployed in other hardware environments (e.g., network based, cloud-computing based, multi-user based, single-user based, with or without one or more microscopes and/or other imaging modality(ies), etc., or any combination thereof. Those skilled in the art will readily understand how to not only configure HIC software 2804 and/or AIM software 2808 for use in any type of hardware environment but will also understand how to effect deployment of the software to the target environment. In addition, it is noted that while HIC software 2804 and AIM software 2808 are referred to as separate software, this is not to imply that they are pieces of software (e.g., applications, modules, etc.) that are separate and distinct from one another. On the contrary, the terms "HIC software" and "AIM software" are used for convenience only to distinguish their respective functionalities relative to one another. Indeed, HIC software 2804 and AIM software 2808 may be combined into a single computer application if desired.

In the example of FIG. 28, deployment 2800 includes a computing system 2812 that executes computer-executable instructions 28041 and 28081 contained, respectively, in HIC and AIM software 2804 and 2808. Computing system 2812 may take any of many differing forms, ranging from a standalone computing system, such as a desktop computer, laptop computer, tablet computer, smartphone, etc., to a local-area-network-based computing system to a wide- or global-area-network-based computing system, such as an Internet-based computing system, with local and/or distributed computing functionality. Computing system 2812 includes memory 2816 that stores, among other things, computer-executable instructions 28041 and 28081, and one or more processors 2820 that execute, among other things, such computer-executable instructions. For the sake of convenience because of the multitude of forms of memory used in computing systems, memory 2816 collectively represents any and all types of machine memory (i.e., not transitory signals) used by processor(s) 2820 and computing system 2812 more generally, to carry out all functionality of the computing system. Consequently, memory 2816 may include any one or more forms of non-volatile memory (e.g., non-volatile storage memory and non-volatile memory, including non-volatile main memory) and/or any one or more forms of volatile memory (e.g., static random-access memory (RAM), dynamic RAM, etc.), among others. Fundamentally, there is no limitation on the type of machine memory that can be used as or be part of memory 2816.

Deployment 2800 includes one or more electronic displays 2824 (only one shown for convenience) each for displaying one or more UIs and/or portion(s) thereof of HIC and AIM software 2804 and 2808. Each electronic display 2824 may be based on any suitable display technology, such as LED, LCD, or plasma, among others. Fundamentally, there is no limitation on the type of each electronic display 2824 as long as it allows a user to view the appropriate UI(s) or portion(s) thereof, including any image(s) displayed thereby, such as one or more histological section image(s), one or more composited 3D histological section based images, and/or one or more atlas images, among others. It is noted that in the appended claims, the use of the term "electronic display" denotes not only a single display, but also multiple displays that a user may use to view any one or more user interfaces of HIC and/or AIM software 2804 and 2808. This is in recognition of current common practices of using multiple electronic displays (e.g., computer monitors) at a single workstation and of using large mosaicked displays made of multiple display tiles. Any one or more of electronic displays 2824 may be touchscreen enabled using any suitable touchscreen technology. Such touchscreen technology may be used as a human-computer interaction (HCI) interface for HIC and/or AIM software 2804 and 2808 to allow the user to interact with the software using suitable gesturing. Each electronic display 2824 may be associated with one or more HCI devices 2828 other than a touchscreen, such as a computer mouse, a trackball, a tablet-input device, among others.

In this example, deployment 2800 includes one or more imaging modalities 2832, such as one or more microscopes, one or more magnetic resonance imaging (MRI) scanners, one or more computed tomography (CT) scanners, one or more microCT scanners, one or more positron emission tomography (PET) scanners, and/or one more macro imaging devices (e.g., block-face imaging devices), among others, that can capture images of histological sections (not shown). It is noted that for each imaging modality 2832 that is a microscope, the microscope may be of any suitable type, such as an optical microscope. In some embodiments, one or more of imaging modality(ies) 2832 may be automatically controllable in one more ways, such as x-y stage location, magnification power, and/or focus, among others, to permit certain features of AIM software 2808 to be utilized, such as the live-view functionalities described above. In some embodiments, one or more of imaging modality(ies) 2832 may only be used for capturing histological section images, such as histological section images 2836 of a single biological mass stored in memory 2816. It is noted that in other embodiments, deployment 2800 need not include any imaging modalities. In such a case, any histological section images, such as histological section images 2836(1) to 2836(N), used by HIC and/or AIM software 2804 and 2808 may be obtained from a source other than deployment 2800, such as from another computing system or one or more imaging modalities not part of deployment 2800.

Histological section images 2836(1) to 2836(N) may be composed, for example, of any one or more unmodified input images (e.g., from one or more imaging modalities 2832, if present, and/or from another source), one or more images modified by HIC software 2804 (e.g., to include corrected outlining, to flip an image, to rotate an image, etc., and any combination(s) thereof), and/or one or more images modified by AIM software 2808 (e.g., to include anatomical region delineation(s), to include ontological hierarchy annotation(s), to include other anatomical and/or histological annotation(s), etc., and any combination thereof. Histological section images 2836(1) to 2836(N) may be of a single tissue block or from multiple tissue blocks. When HIC software 2804 is used to create 3D volume images, memory 2816 may also contain one or more 3D volume images 2840 that HIC software 2804 has constructed from a corresponding set of histological section images from histological section images 2836(1) to 2836(N). When AIM software 2808 is used, memory 2816 will contain one or more tissue block atlases 2844, each of which may include one or more 3D atlas images, ontological hierarchy information, and/or other relevant information.

To present some specific examples, in some embodiments HIC software 2804 may store an output 3D histological image by resampling the input histological images with the computed composite section-to-section transforms. The output 3D image can be resampled at any resolution. HIC software 2804 may save a project file that includes all information related to section segmentation, section ordering, and registration. The section-to-section transforms are saved in an ITK text file format so that reconstructions can be modified or resampled at a different date. In some embodiments, AIM software 2808 may save annotation data in the Neurolucida XML data format, which is an exposed proprietary data format of MBF Bioscience, Williston, Vt., that is externally accessible by third parties. AIM software 2808 may also save section-to-atlas transforms for non-live section images so that additional annotations and/or analyses can be made at a different time.

In example deployment 2800, HIC software 2804 is configured to execute a variety of algorithms that perform the corresponding respective functionalities described above. Examples of algorithms encoded into HIC software 2804 include: one or more automated segmentation algorithms 2804A(1); one or more automated ordering algorithms 2804A(2); one or more automated section recognition algorithms 2804A(3); one or more automated section identification algorithms 2804A(4); one or more automated section labeling algorithms 2804A(5); one or more image editing algorithms 2804A(6); one or more image ordering algorithms 2804A(7); one or more automated section-image registration algorithms 2804A(8); one or more automated flipped section handling algorithms 2804A(9); and one or more axis of symmetry registration algorithms 2804A(10), among others.

In example deployment 2800, HIC software 2804 is also configured to present a variety of UIs that allow a user to interact with various functionalities of the HIC software. Examples of UIs that HIC software 2804 is encoded to provide include: a workflow UI 2804U(1) (see, e.g., FIG. 3); a list of slide image files editing UI 2804U(2) (see, e.g., FIG. 4); an advance section image ordering UI 2404U(3) (see, e.g., FIGS. 5 and 7); a finalize section order UI 2404U(4) (see, e.g., FIG. 8); a registration process control UI 2404U(5) (see, e.g., FIG. 9A); a manual editing UI 2404U(6) (see, e.g., FIG. 9B); and a volume slice visualization UI 2804U(7) (see, e.g., FIGS. 10 and 11), among others.

In example deployment 2800, AIM software 2808 is configured to execute a variety of algorithms that perform the corresponding respective functionalities as described above. Examples of algorithms encoded into AIM software 2808 include: one or more average tissue block creating algorithms 2808A(1); one or more 2D image to 3D atlas image registration algorithms 2808A(2); one or more atlas-based 2D contour overlay algorithms 2808A(3); one or more atlas-based 3D mesh overlay algorithms 2808A(4); one or more atlas-based ontological-information labeling algorithms 2808A(5); one or more contour/mesh boundary editing algorithms 2808A(6); one or more section image and atlas image(s) display algorithms 2808A(7); one or more live-view imaging-modality (e.g., microscope) control algorithms 2808A(8); and one or more automated cell-detection algorithm 2808A(9), among others.

In example deployment 2800, AIM software 2808 is also configured to present a variety of UIs that allow a user to interact with various functionalities of the AIM software. Examples of UIs that AIM software 2808 is encoded to provide include: a section/atlas visualization UI 2808U(1) (see, e.g., FIG. 13); a histological section image UI 2808U(2) (see, e.g., FIGS. 14 and 19-26); a 3D atlas UI 2808U(3) (see, e.g., FIGS. 14 and 19-23); a fixed/moving visualization UI 2808U(4) (see, e.g., FIGS. 15A and 15B); a file-selection dialog UI 2808U(5) (see, e.g., FIG. 16); an atlas-selection dialog UI 2808U(6) (see, e.g., FIG. 18); and a "Cell Detector" dialog window UI 2808U(7) (see, e.g., FIG. 27), among others.

As those skilled in the art will readily appreciate, the foregoing example algorithms 2804A(1) to 2804A(10) and 2808A(1) to 2808A(9) and UIs 2804U(1) to 2804U(7) and 2808U(1) to 2808U(6) of HIC and AIM software 2804 and 2808 interact with various physical components of deployment, such as memory 2816, processor(s) 2820, electronic display(s) 2824, HCI device(s) 2828, and imaging modality(ies) 2832, as well as any one or more of histological section images 2836(1) to 2836(N), any one or more assembled 3D volume images 2840), any one or more corresponding tissue block atlases 2844, and any corresponding data tables (not illustrated) using known fundamental computer-programming techniques that need not be elaborated upon here for those skilled in the art to understand how to implement the many novel features, aspects, and functionalities disclosed herein.

Those skilled in the art will readily appreciate that although HIC and AIM software 2804 and 2808 are typically executed on conventional computing hardware, the execution of this specialized software and their unique algorithm, UIs, and functionalities, transforms such conventional hardware into one or more specialized hardware+software based systems, such as an HIC system, an AIM system, a combined HIC/AIM system, a histological section imaging system, a microscopy system, or any other hardware+software system that provides one or more users with one or more of the functionalities described herein. As described above and as those skilled in the art will readily understand, each of these systems solves certain technological problems inherent in conventional histological section processing and handling and inherent in conventional usage of biological atlases.

Example Computing System

It is to be noted that any one or more of the aspects and embodiments described herein may be conveniently implemented in and/or using one or more machines (e.g., one or more computers, one or more communications network devices, one or more electrical distribution network devices, any combination and/or network thereof, among other things) programmed according to the teachings of the present specification, as will be apparent to those of ordinary skill in the computer arts. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, a laptop computer, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 29:
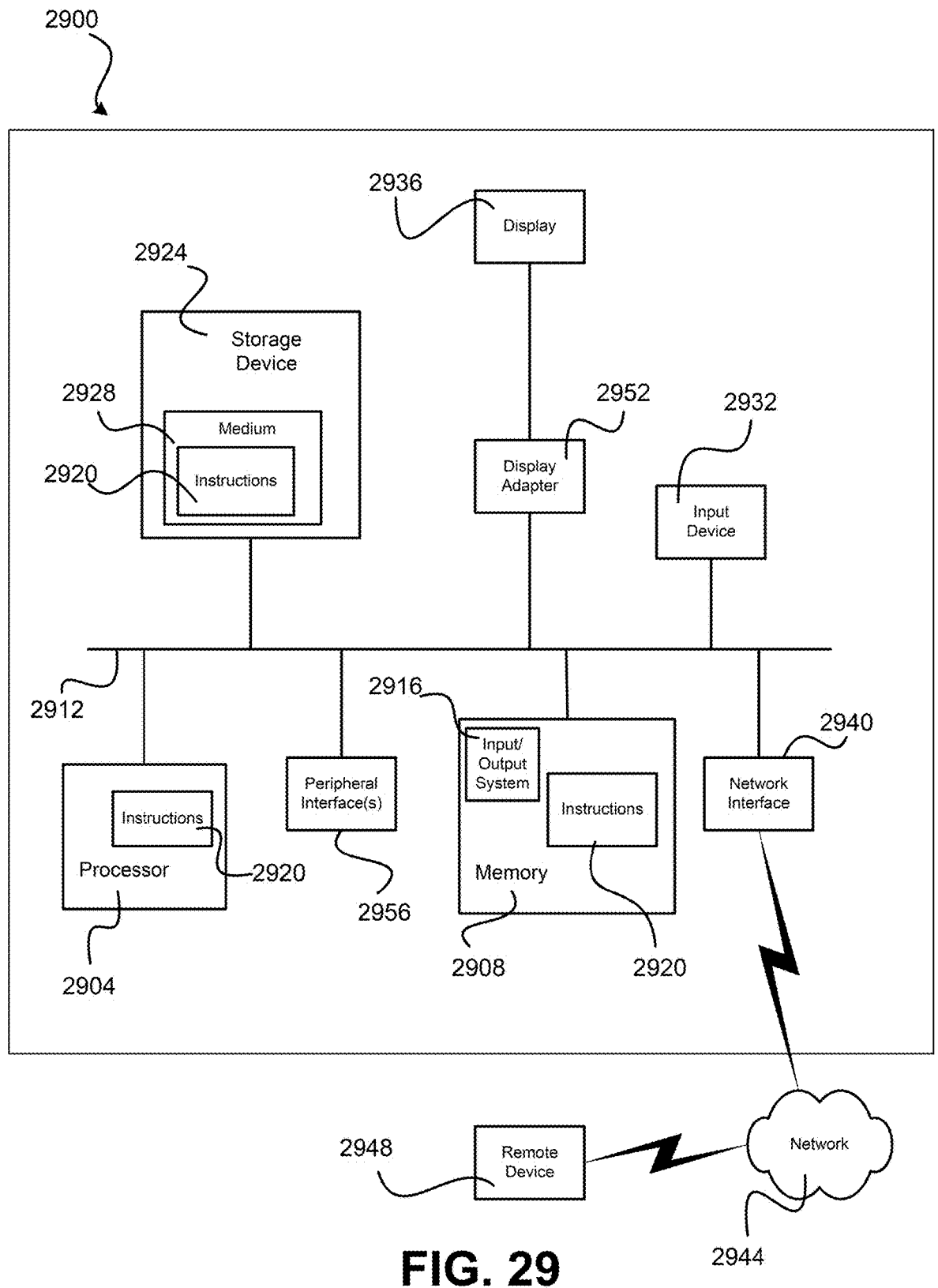
FIG. 29 is a high-level diagram of an example computing system that may be used for deploying any one or more aspects of HIC and AIM software of the present disclosure.

FIG. 29 shows a diagrammatic representation of one embodiment of a computing device in the example form of a computer system 2900 within which a set of instructions for performing any one or more of the aspects and/or methodologies of the present disclosure may be executed. It is also contemplated that multiple computing devices may be utilized to implement a specially configured set of instructions for causing one or more of the devices to contain and/or perform any one or more of the aspects and/or methodologies of the present disclosure. Computer system 2900 includes a processor 2904 and a memory 2908 that communicate with each other, and with other components, via a bus 2912. Bus 2912 may include any of several types of bus structures including, but not limited to, a memory bus, a memory controller, a peripheral bus, a local bus, and any combinations thereof, using any of a variety of bus architectures.

Memory 2908 may include various components (e.g., machine-readable media) including, but not limited to, a random access memory component, a read only component, and any combinations thereof. In one example, a basic input/output system 2916 (BIOS), including basic routines that help to transfer information between elements within computer system 2900, such as during start-up, may be stored in memory 2908. Memory 2908 may also include (e.g., stored on one or more machine-readable media) instructions (e.g., software) 2920 embodying any one or more of the aspects and/or methodologies of the present disclosure. In another example, memory 2908 may further include any number of types of software, including, but not limited to, an operating system, one or more application programs, other program modules, program data, and any combinations thereof.

Computer system 2900 may also include a storage device 2924. Examples of a storage device (e.g., storage device 2924) include, but are not limited to, a hard disk drive, a magnetic disk drive, an optical disc drive in combination with an optical medium, a solid-state memory device, and any combinations thereof. Storage device 2924 may be connected to bus 2912 by an appropriate interface (not shown). Example interfaces include, but are not limited to, SCSI, advanced technology attachment A(TA), serial ATA, universal serial bus U(SB), IEEE 1394 (FIREWIRE), and any combinations thereof. In one example, storage device 2924 (or one or more components thereof) may be removably interfaced with computer system 2900 (e.g., via an external port connector (not shown)). Particularly, storage device 2924 and an associated machine-readable medium 2928 may provide nonvolatile and/or volatile storage of machine-readable instructions, data structures, program modules, and/or other data for computer system 2900. In one example, software 2920 may reside, completely or partially, within machine-readable medium 2928. In another example, software 2920 may reside, completely or partially, within processor 2904.

Computer system 2900 may also include an input device 2932. In one example, a user of computer system 2900 may enter commands and/or other information into computer system 2900 via input device 2932. Examples of an input device 2932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 2932 may be interfaced to bus 2912 via any of a variety of interfaces (not shown) including, but not limited to, a serial interface, a parallel interface, a game port, a USB interface, a FIREWIRE interface, a direct interface to bus 2912, and any combinations thereof. Input device 2932 may include a touch screen interface that may be a part of or separate from display 2936, discussed further below. Input device 2932 may be utilized as a user selection device for selecting one or more graphical representations in a graphical interface as described above.

A user may also input commands and/or other information to computer system 2900 via storage device 2924 (e.g., a removable disk drive, a flash drive, etc.) and/or network interface device 2940. A network interface device, such as network interface device 2940, may be utilized for connecting computer system 2900 to one or more of a variety of networks, such as network 2944, and one or more remote devices 2948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 2944, may employ a wired and/or a wireless mode of communication. In general, any network topology may be used. Information (e.g., data, software 2920, etc.) may be communicated to and/or from computer system 2900 via network interface device 2940.

Computer system 2900 may further include a video display adapter 2952 for communicating a displayable image to a display device, such as display device 2936. Examples of a display device include, but are not limited to, a liquid crystal display (LCD), a cathode ray tube (CRT), a plasma display, a light emitting diode (LED) display, and any combinations thereof. Display adapter 2952 and display device 2936 may be utilized in combination with processor 2904 to provide graphical representations of aspects of the present disclosure. In addition to a display device, computer system 2900 may include one or more other peripheral output devices including, but not limited to, an audio speaker, a printer, and any combinations thereof. Such peripheral output devices may be connected to bus 2912 via a peripheral interface 2956. Examples of a peripheral interface include, but are not limited to, a serial port, a USB connection, a FIREWIRE connection, a parallel connection, and any combinations thereof.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of mapping atlas information to a histological section image of a histological section acquired from a tissue block, the method being performed by a histological section imaging system and comprising:
   receiving the histological section image, wherein the histological section image is a 2D histological section image;
   executing an image-registration algorithm to register the histological section image directly with a 3D atlas image of a tissue-block atlas representative of the tissue block so as to automatically determine an atlas section image corresponding to the histological section, wherein executing the image-registration algorithm includes determining a sectioning axis for the 3D atlas image;
   displaying the histological section image to a user on an electronic display;
   displaying the atlas section image to the user on the electronic display;
   receiving, via a user interface of the histological section imaging system, a user input from the user indicating a selection of an anatomical region;
   retrieving anatomical information from the tissue block atlas based on the user input;
   displaying the anatomical information on the electronic display and in association with the histological section image;
   executing a first image-registration algorithm to perform a first registration of the 2D histological section image to the 3D atlas image, wherein the first registration includes a coarse-to-fine search along the sectioning axis;
   executing a second image-registration algorithm to perform a second registration that refines favorable candidate positions along the sectioning axis;
   executing a third image-registration algorithm to perform a third registration that refines favorable candidate transforms allowing for oblique angles and scale differences due to histological processing;
   executing a fourth image-registration algorithm to perform a fourth registration that refines a best candidate image slice of the 3D atlas image from the third registration; and
   generating and storing an association of the best candidate image slice to the 2D histological section image.

2. The method according to claim 1, wherein the anatomical information comprises anatomical region delineation.

3. The method according to claim 1, wherein the anatomical information comprises anatomical region labels.

4. The method according to claim 1, wherein the receiving a user input includes receiving a user input directed to the histological section image.

5. The method according to claim 1, wherein the receiving a user input includes receiving a user input directed to the atlas section image.

6. The method according to claim 1, further comprising displaying an ontological hierarchy on the electronic display, wherein the receiving of a user input includes receiving a user input via the ontological hierarchy displayed on the electronic display.

7. The method according to claim 1, further comprising highlighting the anatomical region in the atlas section image.

8. The method according to claim 1, further comprising highlighting the anatomical region in a display of at least a portion of the 3D atlas image.

9. The method according to claim 1, further comprising highlighting the anatomical region in a graphically displayed ontological hierarchy.

10. A method of controlling an imaging system to display a live-view image of a histological section in a field of view of an imaging device that is part of the imaging system, wherein the histological section is from a biological tissue block and is a 2D histological section image, the method comprising:
    obtaining the live-view image of the histological section from the imaging device;
    displaying the live-view image to a user on an electronic display;
    executing an image-registration algorithm to register the live-view image directly with a 3D atlas image of a tissue-block atlas representative of the tissue block so as to automatically determine an atlas section image corresponding to the histological section, wherein executing the image-registration algorithm includes determining a sectioning axis for the 3D atlas image;
    displaying the atlas section image to the user on the electronic display;
    receiving, via a user interface of the imaging system, a user input from the user indicating a selection of an anatomical region from within a display of the live-view image, the atlas section image, or an ontological hierarchy;
    based on the user input, causing the imaging system to change the display of the live-view image on the electronic display;
    executing a first image-registration algorithm to perform a first registration of the 2D histological section image to the 3D atlas image, wherein the first registration includes a coarse-to-fine search along the sectioning axis;
    executing a second image-registration algorithm to perform a second registration that refines favorable candidate positions along the sectioning axis;
    executing a third image-registration algorithm to perform a third registration that refines favorable candidate transforms allowing for oblique angles and scale differences due to histological processing;

executing a fourth image-registration algorithm to perform a fourth registration that refines a best candidate image slice of the 3D atlas image from the third registration; and generating and storing an association of the best candidate image slice to the 2D histological section image.

11. The method according to claim 10, wherein the causing of the imaging system to change the display of the live-view image includes executing an imaging device control algorithm to cause the imaging device to change at least one of a magnification power and a location of the histological section in the field of view or a location of the field of view relative to the histological section.

12. The method according to claim 11, further comprising:

implementing a unified, registered coordinate system that is common to the imaging device and the atlas image; and controlling the imaging device based on the unified, registered coordinate system.

13. The method according to claim 10, wherein the causing of the imaging system to change the display of the live-view image includes executing an image-annotation algorithm that visually annotates the live-view image with information from the tissue-block atlas.

14. The method according to claim 13, further comprising:

retrieving anatomical information from the tissue block atlas based on the user input; and displaying the anatomical information on the live-view image.

15. The method according to claim 14, wherein the anatomical information comprises anatomical region delineation.

16. The method according to claim 14, wherein the anatomical information comprises anatomical region labels.

17. The method according to claim 10, wherein the receiving a user input includes receiving a user input made via the display of the live-view image.

18. The method according to claim 10, wherein the receiving a user input includes receiving a user input made via the display of the atlas section image.

19. The method according to claim 10, wherein the receiving of a user input includes receiving a user input via the display of the ontological hierarchy.

20. The method according to claim 10, wherein the imaging system is a microscopy system and the imaging device is a microscope.

* * * * *